(12) United States Patent
Komiya et al.

(10) Patent No.: US 6,661,444 B2
(45) Date of Patent: Dec. 9, 2003

(54) LIGHT BEAM SCANNING APPARATUS

(75) Inventors: Kenichi Komiya, Kawasaki (JP); Koji Tanimoto, Kawasaki (JP); Daisuke Ishikawa, Tokyo (JP); Koji Kawai, Fujisawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 71 days.

(21) Appl. No.: 10/134,488

(22) Filed: Apr. 30, 2002

(65) Prior Publication Data
US 2003/0202086 A1 Oct. 30, 2003

(51) Int. Cl.⁷ .................................. B41J 2/435
(52) U.S. Cl. ........................ 347/235; 347/250
(58) Field of Search ................. 347/233, 235, 347/237, 250, 347; 250/208.1, 235

(56) References Cited

U.S. PATENT DOCUMENTS

| | | |
|---|---|---|
| 5,892,533 A | 4/1999 | Tanimoto et al. |
| 6,243,123 B1 | 6/2001 | Tanimoto et al. |
| 6,392,684 B1 | 5/2002 | Tanimoto et al. |
| 6,411,321 B2 | 6/2002 | Tanimoto et al. |
| 6,462,855 B1 * | 10/2002 | Komiya et al. ............. 359/212 |
| 6,509,921 B2 * | 1/2003 | Komiya et al. ............. 347/235 |

OTHER PUBLICATIONS

US 6,353,454, 3/2002, Tanimoto et al. (withdrawn)

U.S. patent application Ser. No. 09/816,773, Komiya et al.

U.S. patent application Ser. No. 09/667,317, Komiya et al.

U.S. patent application Ser. No. 09/461,771, Komiya et al.

* cited by examiner

Primary Examiner—Huan Tran
(74) Attorney, Agent, or Firm—Foley & Lardner

(57) ABSTRACT

A light beam scanning apparatus controls a scan position for a light beam with a first light volume so that output from a sensor is adjusted to a target value. Further, the light beam scanning apparatus controls a scan position for the light beam with a second light volume so that output from the sensor is adjusted to the target value.

14 Claims, 16 Drawing Sheets

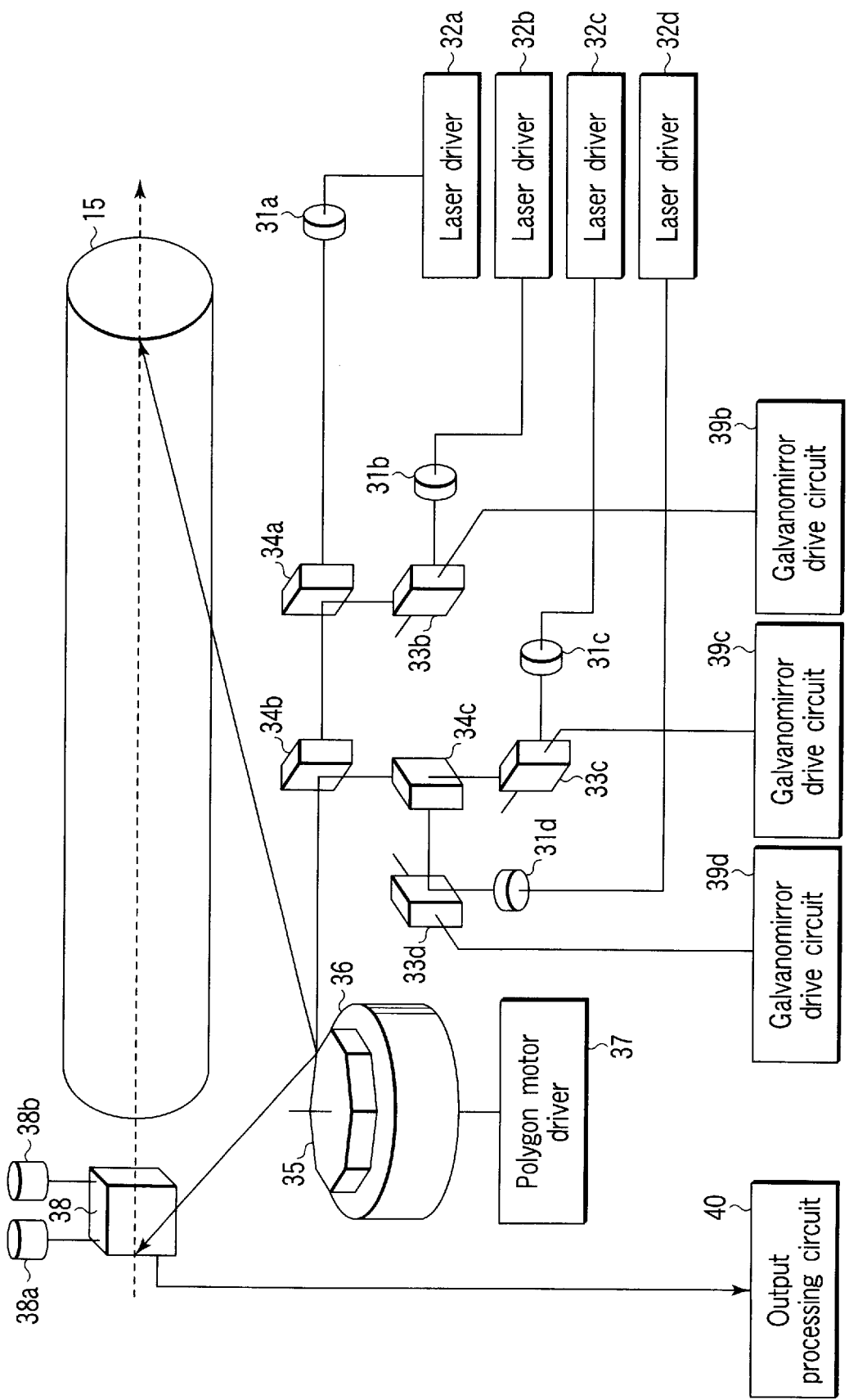
F I G. 2

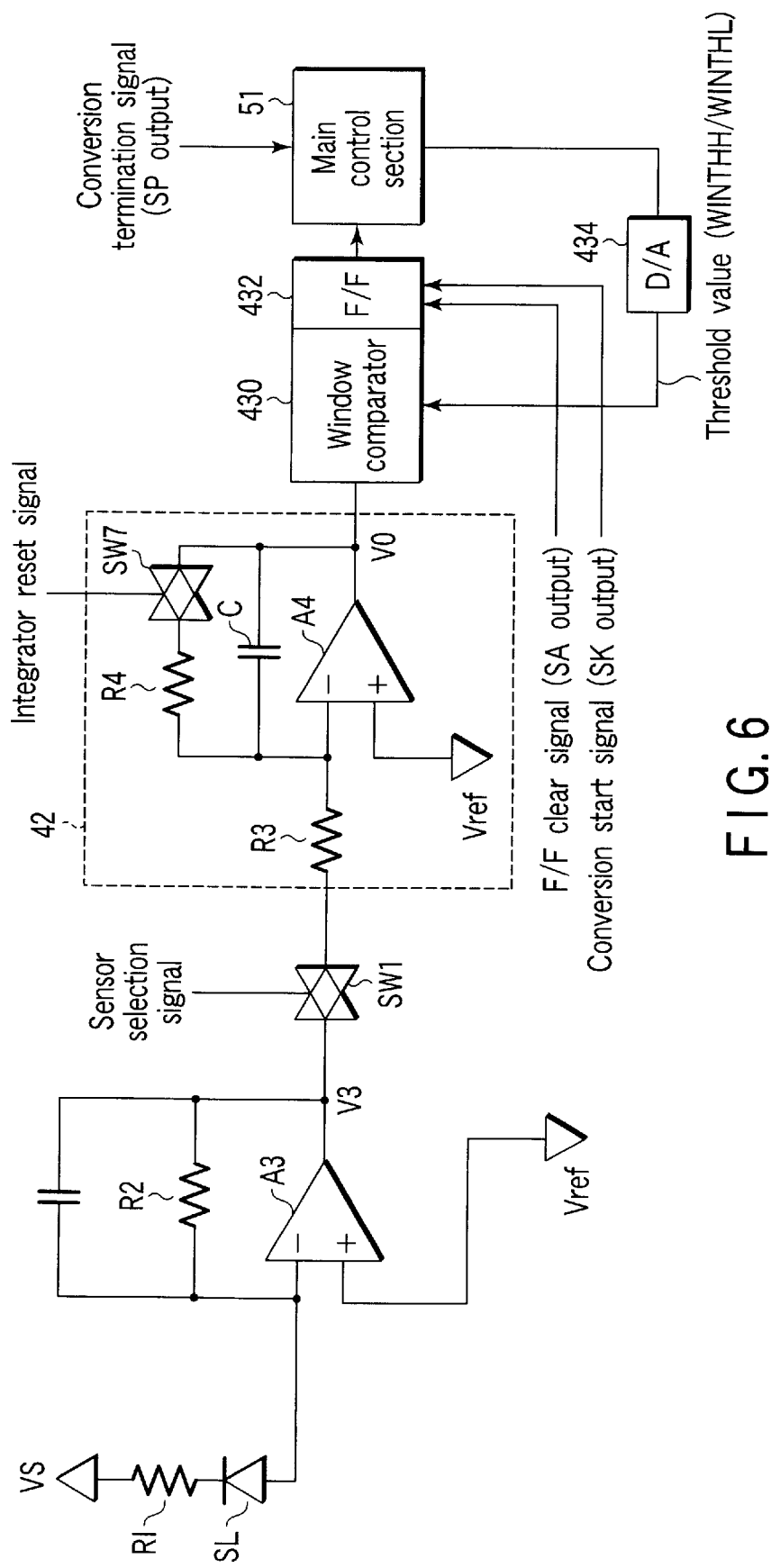
F I G. 6

LIGHT BEAM SCANNING APPARATUS

BACKGROUND OF THE INVENTION

The present invention relates to a light beam scanning apparatus used for image formation apparatuses such as a digital copier, a laser printer, etc. which use a laser light beam to scan and expose a photoconductor drum and form an electrostatic latent image on the photoconductor drum.

In recent years, there have been developed various digital copiers which are equipped with a light beam scanning apparatus to perform scanning and exposure using a laser light beam (hereafter simply referred to as the light beam) and use an electrophotographic process to form an image.

Recently, a multi-beam digital copier is developed for increasing an image formation speed. Such multi-beam digital copier is provided with a light beam scanning apparatus which simultaneously scans a plurality of lines by using a plurality of light beams.

In order to form a high-quality image, a digital copier mounted with an optical unit using the above-mentioned light beam scanning apparatus controls a light beam exposure position in the horizontal scan direction and a light beam passage position in the vertical scan direction.

For example, a conventional light beam scanning apparatus detects a light beam by using a sensor arranged on an exposure surface or a position level to the exposure surface. The apparatus controls light beams based on a sensor's detection output.

However, the following problems arise when improving the light beam's detection accuracy and control accuracy.

Improving the light beam's detection accuracy may require a high-resolution circuit for processing a light beam detection output. Such circuit may make the light beam control difficult.

An offset in the circuit for processing a light beam detection output may disable provision of the intended detection accuracy or cause a processing error.

The flare generated around a light beam may cause an error for the light beam passage position and the light beam control.

A vibration etc. may change the light beam passage position and disable the accurate detection of the light beam passage position.

If these causes make it impossible to provide the intended detection accuracy and the control accuracy for a light beam, there is a problem of deteriorating the quality of an image formed by the light beam. If the light beam's detection accuracy and control accuracy cannot be improved, it becomes difficult to provide a high-quality image formed by the light beam.

BRIEF SUMMARY OF THE INVENTION

It is therefore an object of the present invention to provide a light beam scanning apparatus capable of improving the light beam's detection accuracy and control accuracy and providing a high-quality image formed by the light beam.

A light beam scanning apparatus according to the present invention controls a light beam and comprises: a light source to generate the light beam; a scanning section to scan the light beam generated from the light source; a pair of sensors comprising a plurality of photoelectric conversion elements, wherein output from one sensor increases and output from the other sensor decreases according to a change of the light beam scan position in the vertical scan direction; and a control section which controls the light beam scan position in the vertical scan direction so that a difference between outputs from the pair of sensors becomes a target value, wherein the light beam volume output from the light source is set to a first light volume and the light beam volume output from the light source is set to a second light volume larger than the first light volume.

A light beam scanning apparatus according to the present invention controls a light beam and comprises: a light source to generate the light beam; a scanning section to scan the light beam generated from the light source; a sensor which comprises a plurality of photoelectric conversion elements and outputs a signal corresponding to the light beam scan position in the vertical scan direction; a comparator which compares an output from the sensor with upper and lower bounds as a target value for that output; a control section which controls the light beam scan position in the vertical scan direction based on a comparison result from this comparator so that an output from the sensor falls between the lower bound and the upper bound; and a single setup section which supplies the comparator with the lower bound and the upper bound specified by the control section.

A light beam scanning apparatus according to the present invention controls a light beam and comprises: a light source which generates the light beam having a specified diameter; a scanning section to scan the light beam generated from the light source; a pair of sensors which comprise a plurality of photoelectric conversion elements and are arranged so that the sensors are symmetrical with reference to a control target for the light beam's scan position in the vertical scan direction and an entire width in the vertical scan direction becomes smaller than the light beam's specified diameter in the vertical scan direction; and a control section which controls a peak position of the light volume for the light beam scanned by the scanning section in the horizontal scan direction based on a difference between outputs from the pair of sensors so that the peak position is aligned to the control target position.

A light beam scanning apparatus according to the present invention controls a light beam and comprises: a light source to generate the light beam; a scanning section to scan the light beam generated from the light source; a sensor which comprises a plurality of photoelectric conversion elements and outputs a signal corresponding to a light beam scan position in the vertical scan direction; memory which stores an output value from the sensor each time the scanning section scans the light beam in the horizontal scan direction; and a determination section which determines the light beam scan position based on a plurality of output values store in this memory.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

FIG. 2 outlines a configuration of an optical unit;

FIG. 6 shows an example of a circuit configuration including an integrator for processing a signal from a sensor pattern SL;

DETAILED DESCRIPTION OF THE INVENTION

Embodiments of the present invention will be described in further detail with reference to the accompanying drawings.

First, the following describes a configuration example of an image formation apparatus capable of using the light beam scanning apparatus to be explained in each embodiment.

Figure 1:
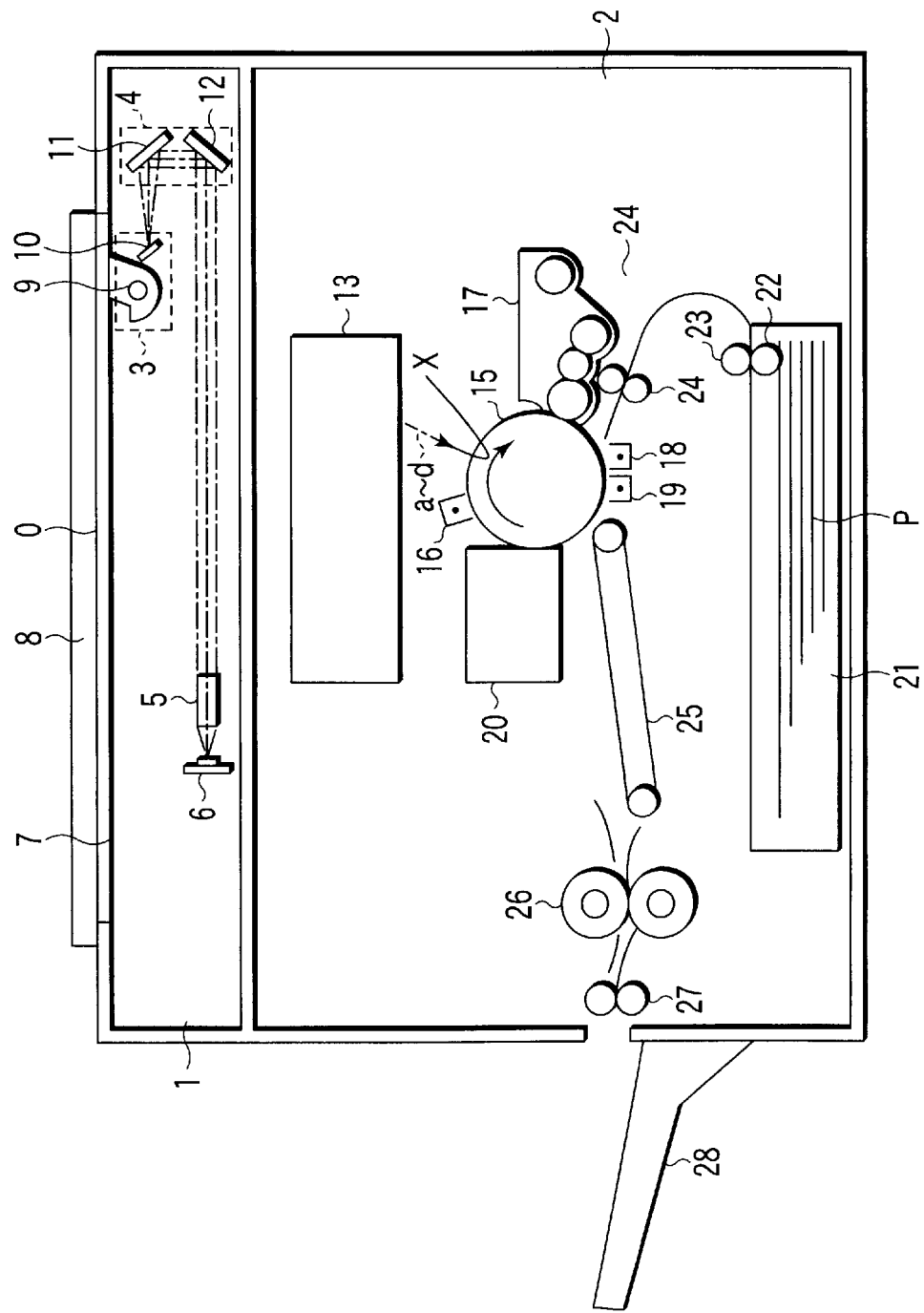
FIG. 1 outlines a configuration of a digital copier.

FIG. 1 schematically shows a configuration of a digital copier as the image formation apparatus. The digital copier comprises a scanner 1 and a printer 2. The scanner 1 reads an image on a document 0. The printer 2 forms an image on an image formation medium. The scanner 1 comprises a first carriage 3 and a second carriage 4 movable in the direction of an arrow, an image formation lens 5, a photoelectric conversion element 6, etc.

In FIG. 1, the document 0 is placed with its face down on a transparent document glass plane 7 and is pressed against the document glass plane 7 with a document cover 8 which opens and closes freely.

The document 0 is illuminated by a light source 9. The reflected light is condensed on a light receiving face of the photoelectric conversion element 6 via mirrors 10, 11, and 12, and the image formation lens 5. The first carriage 3 is equipped with the light source 9 and the mirror 10. The second carriage 4 is equipped with the mirrors 11 and 12. The first carriage 3 and the second carriage 4 move at a relative speed of 2:1 so as to always keep an optical path length constant. Driven by a carriage drive motor (not shown), the first carriage 3 and the second carriage 4 move from right to left in synchronization with a read timing signal.

The scanner 1 sequentially reads an image of the document 0 placed on the document glass plane 7 line by line. An image processing section (not shown) converts a read output to an 8-bit digital image signal representing gradation of the image.

The printer 2 comprises an optical unit (light beam scanning apparatus) 13 and an image formation section 14 coupled with the electrophotography capable of image formation on paper P as an image formation medium. An image signal read by the scanner 1 from the document 0 is processed in an image processing section (not shown), and then is converted to a laser light beam (hereafter just referred to as a light beam) from the semiconductor laser oscillator. The digital copier as shown in FIG. 1 includes a multi-beam optical system which uses a plurality of semiconductor laser oscillators (e.g., four oscillators). When the digital copier uses a single-beam optical system, there is provided one semiconductor laser oscillator. The other configuration is the same as that for the digital copier in FIG. 1.

A plurality of semiconductor laser oscillators in the optical unit 13 emits light to generate a plurality of light beams according to a laser modulation signal output from the image processing section (not shown). The plurality of light beams is reflected on a polygon mirror to become scanning light which is output outside the optical unit 13. The optical unit 13 will be detailed later.

A plurality of light beams output from the optical unit 13 is formed as spot light having necessary resolution at an exposure position X on a photoconductor drum 15 as an image support. The light is scanned on the photoconductor drum 15 in the horizontal scan direction (along the photoconductor drum's rotation axis). Further, rotating the photoconductor drum 15 forms an electrostatic latent image corresponding to the image signal on the photoconductor drum 15.

Near the photoconductor drum 15, there are provided an electrostatic charger 16 for charging the surface thereof, a developing machine 17, a transfer charger 18, a release charger 19, a cleaner 20, and the like. The photoconductor drum 15 is rotatively driven by a drive motor (not shown) at a peripheral speed and is electrostatically charged by the electrostatic charger 16 facing the surface of the drum. A plurality of light beams is arranged in the vertical scan direction (along movement of the photoconductor drum surface) and is imaged as spots at the exposure position X on the charged photoconductor drum 15.

The electrostatic latent image formed on the photoconductor drum 15 is developed as a toner image by means of toner (developer) from the developing machine 17. The transfer charger 18 transfers the toner image formed on the photoconductor drum 15 to paper P supplied from a paper feed system at a proper timing.

A paper feed cassette 21 mounted at the bottom of the unit. A paper feed roller 22 and a separation roller 23 are used to separately pick up a sheet of paper P from the paper feed cassette 21 and feed the paper P to a resist roller 24. When the paper P reaches the resist roller 24, it is fed to a transfer position at a specified timing. Downstream from the transfer charger 18, there are provided a paper transport mechanism 25, a fixer 26, and an eject roller 27 for ejecting the imaged paper P. The fixer 26 fixes the toner image transferred to the paper P at the transfer position. The paper P with the toner image fixed by the fixer 26 is then ejected to an external eject tray 28 via the eject roller 27.

After completion of transfer to the paper P, the cleaner 20 removes toner remaining on the surface of the photoconductor drum 15. The photoconductor drum 15 with the remaining toner removed then returns to an initial state and is ready for next image formation.

By repeating the above process, an image formation operation is performed successively.

As mentioned above, the scanner 1 reads image data from the document 0 placed on the document glass plane 7. When the scanner 1 reads the image data, the printer 2 records that image data as a toner image on the paper P.

The following describes the optical unit 13 in detail.

FIG. 2 shows a configuration example of the optical unit 13. This figure illustrates positional relationship between the optical unit 13 and the photoconductor drum 15 as well as the configuration example of the optical unit 13. As shown in FIG. 2, for example, the optical unit 13 includes four semiconductor laser oscillators 31a, 31b, 31c, and 31d. The laser oscillators 31a through 31d each form an image every scan line at a time. Because of this, the digital copier as a whole permits fast image formation without significantly increasing a polygon mirror rotation speed.

A laser driver 32a drives a laser oscillator 31a. A light beam output from the laser oscillator 31a passes a collimator lens (not shown), then half mirrors 34a and 34b. After passing the half mirrors 34a and 34b, the light beam enters a polygon mirror 35 as a rotating polygon mirror. For example, the polygon mirror 35 comprises eight mirrors. A polygon motor 36 is driven by a polygon motor driver 37 and rotates the polygon mirror 35 at a constant speed. Light reflected on each face of the polygon mirror 35 scans the photocohductor drum in a given direction at an angular speed determined by a rotation speed of the polygon motor 36. For example, the polygon mirror 35 comprising eight mirrors is so configured that each face scans a single scan amount in the horizontal scan direction. A light beam scanned by the polygon mirror 35 passes an f-θ lens (not shown). According to f-θ characteristics of the f-θ lens, the light beam scans on a light receiving face of a light beam detection section 38 and on the photoconductor drum 15 at a constant speed.

A laser driver 32b drives a laser oscillator 31b. A light beam output from the laser oscillator 31b passes the collimator lens (not shown) and is reflected on a galvanomirror 33b and then on the half mirror 34a. The reflected light from the half mirror 34a passes a half mirror 34b and enters the polygon mirror 35. A path following the polygon mirror 35 is the same as that for the laser oscillator 31a. The light passes the f-θ lens (not shown) and scans on the light receiving face of the light beam detection section 38 and on the photoconductor drum 15 at a constant speed.

A laser driver 32c drives a laser oscillator 31c. A light beam output from the laser oscillator 31c passes the collimator lens (not shown) and is reflected on a galvanomirror 33c. The light beam reflected on the galvanomirror 33c passes a half mirror 34c and is reflected on the half mirror 34b. The light beam reflected on the half mirror 34b enters the polygon mirror 35. A path following the polygon mirror 35 is the same as that for the laser oscillators 31a and 31b. The light beam passes the f-θ lens (not shown) and scans on the light receiving face of the light beam detection section 38 and on the photoconductor drum 15 at a constant speed.

A laser driver 32d drives a laser oscillator 31d. A light beam output from the laser oscillator 31d passes the collimator lens (not shown) and is reflected on a galvanomirror 33d. The light beam reflected on the galvanomirror 33d is reflected on the half mirror 34c and then on the half mirror 34b. The light beam reflected on the half mirror 34b enters the polygon mirror 35. A path following the polygon mirror 35 is the same as that for the laser oscillators 31a, 31b, and 31c. The light beam passes the f-θ lens (not shown) and scans on the light receiving face of the light beam detection section 38 and on the photoconductor drum 15 at a constant speed.

Each of the laser drivers 32a through 32d contains an automatic power control (APC) circuit. The laser drivers 32a through 32d activate the laser oscillators 31a through 31d with an emission power level controlled by a main control section (CPU) 51 to be described later.

Respective light beams output from the laser oscillators 31a, 31b, 31c, and 31d are synthesized through the half mirrors 34a, 34b, and 34c. The four light beams advance toward the polygon mirror 35.

Accordingly, the four light beams can simultaneously scan on the photoconductor drum 15. Given that the rotation speed is unchanged for the polygon mirror 35, the four-beam system can record an image four times faster than a conventional single-beam system.

The galvanomirrors 33b, 33c, and 33d are driven by galvanomirror drive circuits 39b, 39c, and 39d, respectively. The galvanomirrors 33b, 33c, and 33d adjust (control) positions of light beams output from laser oscillators 31b, 31c, and 31d in the vertical scan direction with reference to the light beam output from the laser oscillator 31a.

The light beam detection section 38 is equipped with light beam detection section adjustment motors 38a and 38b for adjusting an installation position of the section and an inclination of the light beam against the scan direction.

The light beam detection section 38 detects passage positions, passage timings, and powers (light volumes) of the four light beams. The light beam detection section 38 is provided near the end of the photoconductor drum 15. The light receiving surface of the light beam detection section 38 is level with the surface of the photoconductor drum 15. A detection signal from the light beam detection section 38 is used for controlling the galvanomirrors 33b, 33c, and 33d corresponding to respective light beams (controlling an image formation position in the vertical scan direction), emission powers of the laser oscillators 31a, 31b, 31c, and 31d, and emission timings (controlling an image formation position in the horizontal scan direction). Details are described later. To generate a signal for these control operations, the light beam detection section 38 connects with a light beam detection section output processing circuit (processing circuit) 40.

Figure 3:
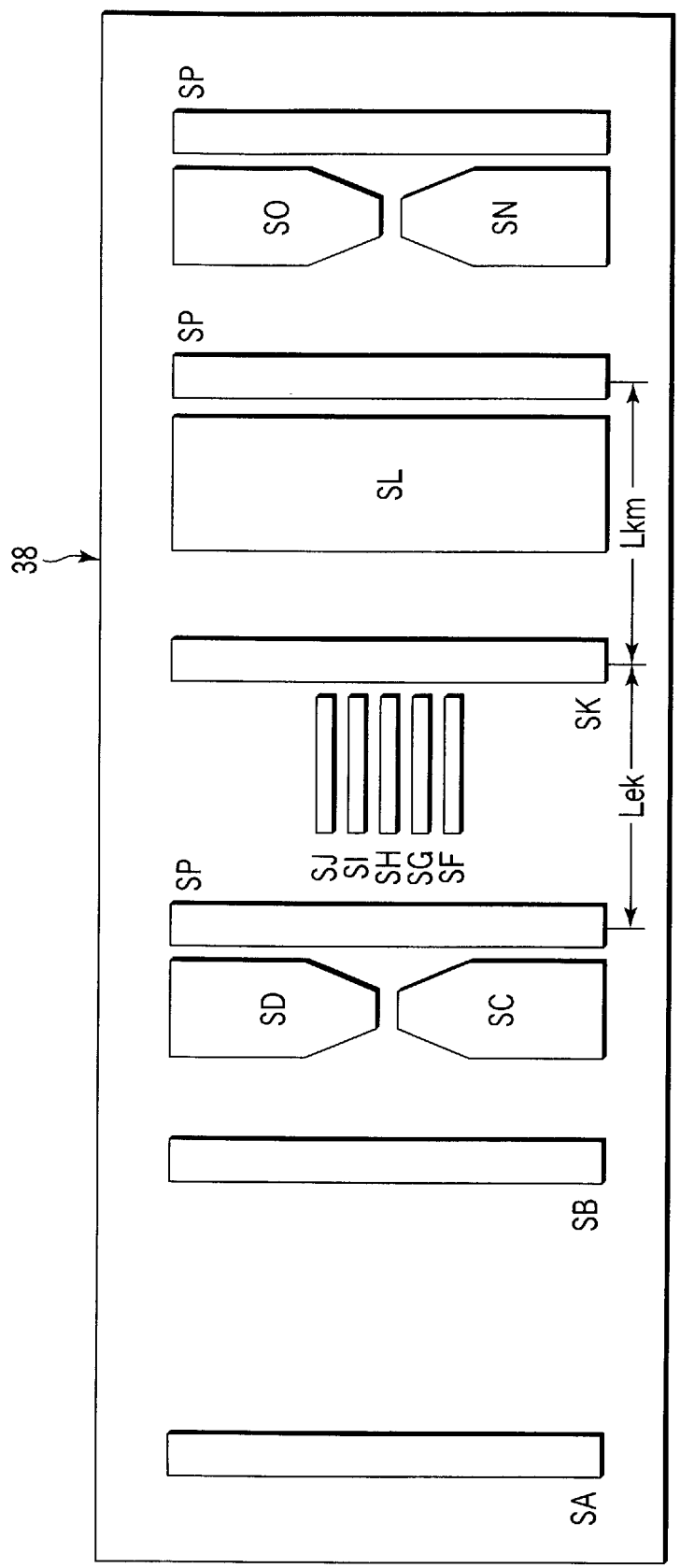
FIG. 3 shows an example of arranging photodetectors SA through SP constituting a light beam detection section.

FIG. 3 shows an example of arranging photodetectors (sensor patterns) SA through SP constituting the light beam detection section 38. As shown in FIG. 3, the photodetectors SA through SP comprise photoelectric conversion elements such as photodiodes. The light beam reflected on the polygon mirror 35 scans the sensor patterns SA through SP from the left (SA) to the right (SP).

The light beam detection section 38 shown in FIG. 3 is available for four beams and the 600 dpi (dots per inch) resolution. The light beam detection section 38 comprises 16 photodetectors SA through SP having a specified shape and arrangement. The following describes functions of the photodetectors (sensor patterns) SA through SP.

The photodetector SA detects the passage timing of a horizontal scan beam on the photoconductor drum 15 and is used to generate various timing signals. Specifically, the photodetector SA is combined with the photodetector SB to generate an integration reset signal for the photodetectors SC and SD which detect an inclination. The photodetector SA is combined with the photodetector SE to generate an integration reset signal for detecting a vertical scan beam position. The photodetector SA is combined with the photodetector SK to generate an integration reset signal for detecting a light beam volume. The photodetector SA is combined with the photodetector SM to generate an integration reset signal for the inclination-detecting photodetectors SN and SO. The photodetector SA is combined with the photodetector SB to generate a synchronization signal (HSYNC signal).

The photodetector SB is used to detect the passage timing of a horizontal scan beam. Specifically, the photodetector SB is combined with the photodetector SA to generate an integration reset signal for the inclination-detecting photodetectors SC and SD. The photodetector SB is combined with the photodetector SA to generate a synchronization signal (HSYNC signal).

The photodetector SC is used to detect a relative inclination between the light receiving surface of the light beam detection section 38 and the light beam which enters the light beam detection section 38. Specifically, the photodetector SC is combined with the photodetector SD to detect an inclination on the upstream side.

The photodetector SD is also used to detect a relative inclination between the light receiving surface of the light beam detection section 38 and the light beam which enters the light beam detection section 38. Specifically, the photodetector SD is combined with the photodetector SC to detect an inclination on the upstream side.

The photodetector SE is used to generate various timings. For example, the photodetector SC is combined with the photodetector SD to generate a signal for starting conversion (A/D conversion) from an analog signal for the inclination detection result (analog amount) to a digital signal. The photodetector SE is combined with the photodetector SA to generate an integration reset signal for detecting a light beam passage position (vertical scan beam position) in the vertical scan direction.

The photodetector SF is combined with the photodetector SG to detect a beam position (vertical scan beam position) of light beam d when the four light beams are represented as a through d.

The photodetector SG is combined with the photodetector SF to detect a beam position (vertical scan beam position) of light beam d. The photodetector SG is combined with the photodetector SH to detect a beam position (vertical scan beam position) of light beam c.

The photodetector SH is combined with the photodetector SG to detect a beam position (vertical scan beam position) of light beam c. The photodetector SH is combined with the photodetector SI to detect a beam position (vertical scan beam position) of light beam b.

The photodetector SI is combined with the photodetector SH to detect a beam position (vertical scan beam position) of light beam b. The photodetector SI is combined with the photodetector SJ to detect a beam position (vertical scan beam position) of light beam a.

The photodetector SJ is combined with the photodetector SI to detect a beam position (vertical scan beam position) of light beam a.

The photodetector SK is used to generate various timings. For example, the photodetector SK generates a signal for starting A/D conversion of the detection result (analog amount) about a vertical scan beam position. The photodetector SK is combined with photodetector SA to generate an integration reset signal for detecting a light beam volume (power).

The photodetector SL is used to detect a light beam volume (power).

The photodetector SM is used to generate various timings. For example, the photodetector SM generates a signal for starting A/D conversion of the detection result (analog amount) about a light beam volume (power).

The photodetector SM is combined with photodetector SA to generate an integration reset signal for detecting an inclination by combining the photodetectors SN and SO.

The photodetector SN is used to detect a relative inclination between the light receiving surface of the light beam detection section 38 and the light beam which enters the light beam detection section 38. For example, the photodetector SN is combined with the photodetector SO to detect an inclination on the downstream side.

The photodetector SO is also used to detect a relative inclination between the light receiving surface of the light beam detection section 38 and the light beam which enters the light beam detection section 38. For example, the photodetector SO is combined with the photodetector SN to detect an inclination on the downstream side.

The photodetector SP is used for processes such as detecting the light beam's passage timing in the horizontal scan direction. For example, the photodetector SP detects the light beam's passage timing in the horizontal scan direction and generates a signal for starting A/D conversion of detection results (analog amounts) from the photodetectors SN and SO.

To sum up, the light beam detection section 38 in FIG. 3 has the functions of (1) detecting a light beam passage position in the vertical scan direction, (2) detecting the light beam passage timing in the horizontal scan direction, (3) detecting a light beam volume (power), and (4) detecting an inclination.

The configuration in FIG. 3 allows a length Lek between the photodetectors SE and SK to be the same as a length Lkm between the photodetector SK and SM. An offset can be detected by integrating sensor outputs from the photodetectors SK and SM without irradiating the light beam to the photodetector SF through SJ.

The following describes a control system of the digital copier in FIG. 1.

Figure 4:
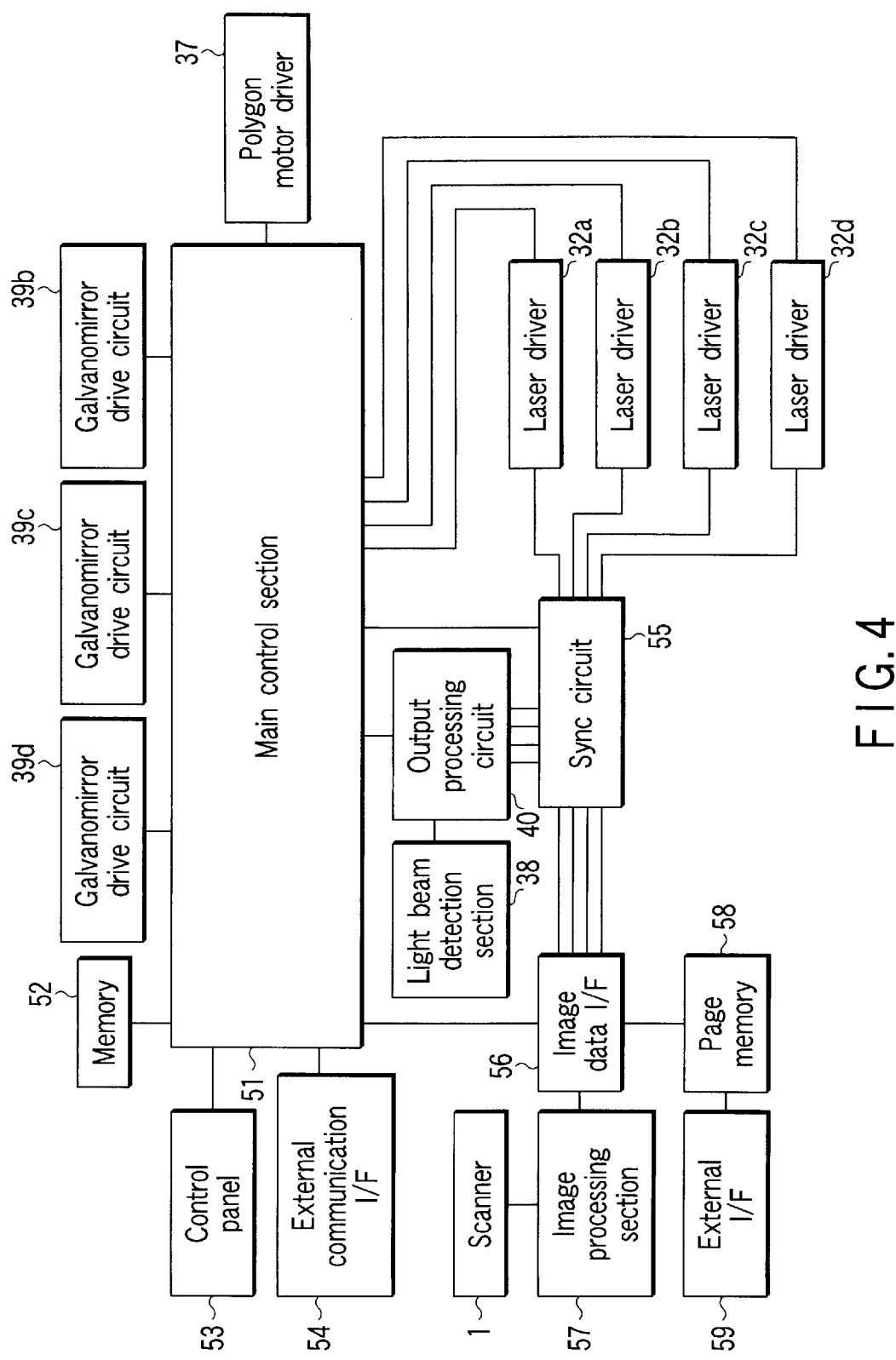
FIG. 4 is a block diagram showing an optical control system.

FIG. 4 shows a configuration example of the digital copier mounted with an optical unit according to the multi-beam optical system. Reference numeral 51 denotes a main control section responsible for overall control and comprises a CPU, for example. The control section 51 connects with memory 52, a control panel 53, an external communication interface (I/F) 54, laser drivers 32a, 32b, 32c, and 32d, a polygon mirror motor driver 37, galvanomirror drive circuits 39b, 39c, and 39d, a light beam detection section output processing circuit 40, a sync circuit 55, and an image data interface (I/F) 56.

The sync circuit 55 connects with the image data I/F 56. The image data I/F 56 connects with an image processing section 57 and page memory 58. The image processing section. 57 connects with the scanner 1. The page memory 58 connects with an external interface (I/F) 59.

The following outlines a flow of image data for forming an image.

During a copy operation, as mentioned above, the scanner 1 reads an image from the document 0 placed on the document glass plane 7. The read image is sent to the image processing section 57. The image processing section 57 provides the image signal from the scanner 1 with known shading correction, various filtering processes, gradation, gamma correction, and the like.

Image data from the image processing section 57 is sent to the image data I/F 56. The image data I/F 56 distributes the image data to the four laser drivers 32a, 32b, 32c, and 32d.

The sync circuit 55 generates a clock synchronized with the timing of each light beam passing on the light beam detection section 38. Synchronously with this clock, the sync circuit 55 allows the image data I/F 56 to send the image data as a laser modulation signal to the laser drivers 32a, 32b, 32c, and 32d.

The sync circuit 55 includes a sample timer, a logical circuit, and the like. The sample timer forcibly activates the laser oscillators 31a, 31b, 31c, and 31d in a non-image region and controls each light beam power. When each beam scans on the light beam detection section 38, the logical circuit activates the laser oscillators 31a, 31b, 31c, and 31d and detects each light beam's position in the horizontal scan direction.

Transmitting image data synchronously with each light beam scanning provides image formation at a correct position in synchronization with the horizontal scan direction.

The control panel 53 is a man-machine interface for starting a copy operation or setting the number of sheets of paper.

The digital copier is configured not only to copy images, but also to form an image from image data input from the outside via the external I/F 59 connected to the page memory 58. Image data input from the external I/F 59 is temporarily stored in the memory 58, and then is sent to the sync circuit 55 via the image data I/F 56.

When the digital copier is externally controlled via a network, for example, the external communication I/F 54 works as the control panel 53.

The galvanomirror drive circuits 39b, 39c, and 39d drive the galvanomirrors 33b, 33c, and 33d according to a value supplied from the main control section 51. Accordingly, the main control section 51 can freely control angles of the galvanomirrors 33b, 33c, and 33d via the galvanomirror drive circuits 39b, 39c, and 39d.

The polygon motor driver 37 drives the polygon motor 36 for rotating the polygon mirror 35 which scans the four light beams. The main control section 51 allows the polygon motor driver 37 to start or stop the rotation and change the rotation speed. When the light beam detection section 38 confirms the light beam's passage position, the polygon motor 36 rotates at a lower speed than for image formation.

The laser drivers 32a, 32b, 32c, and 32d not only generate a laser beam according to image data as mentioned above, but also forcibly operate the laser oscillators 31a, 31b, 31c, and 31d independently of image data according to a forced emission signal from the main control section 51.

The main control section 51 specifies power for light beams emitted from the laser oscillators 31a, 31b, 31c, and 31d by using the laser drivers 32a, 32b, 32c, and 32d, respectively. The emission power setting is changed according to a change in the process condition or detection of a light beam passage position.

The memory 52 stores information needed for control. For example, the memory 52 stores control amounts for the galvanomirrors 33b, 33c, and 33d, circuit characteristics (amplifier's offset values) for detecting light beam passage positions, and the order of arriving light beams, etc. The information stored in the memory 52 makes it possible to allow the optical unit 13 to get ready for image formation immediately after the power is turned on.

The following describes control of light beam's passage (scan) positions.

Figure 5:
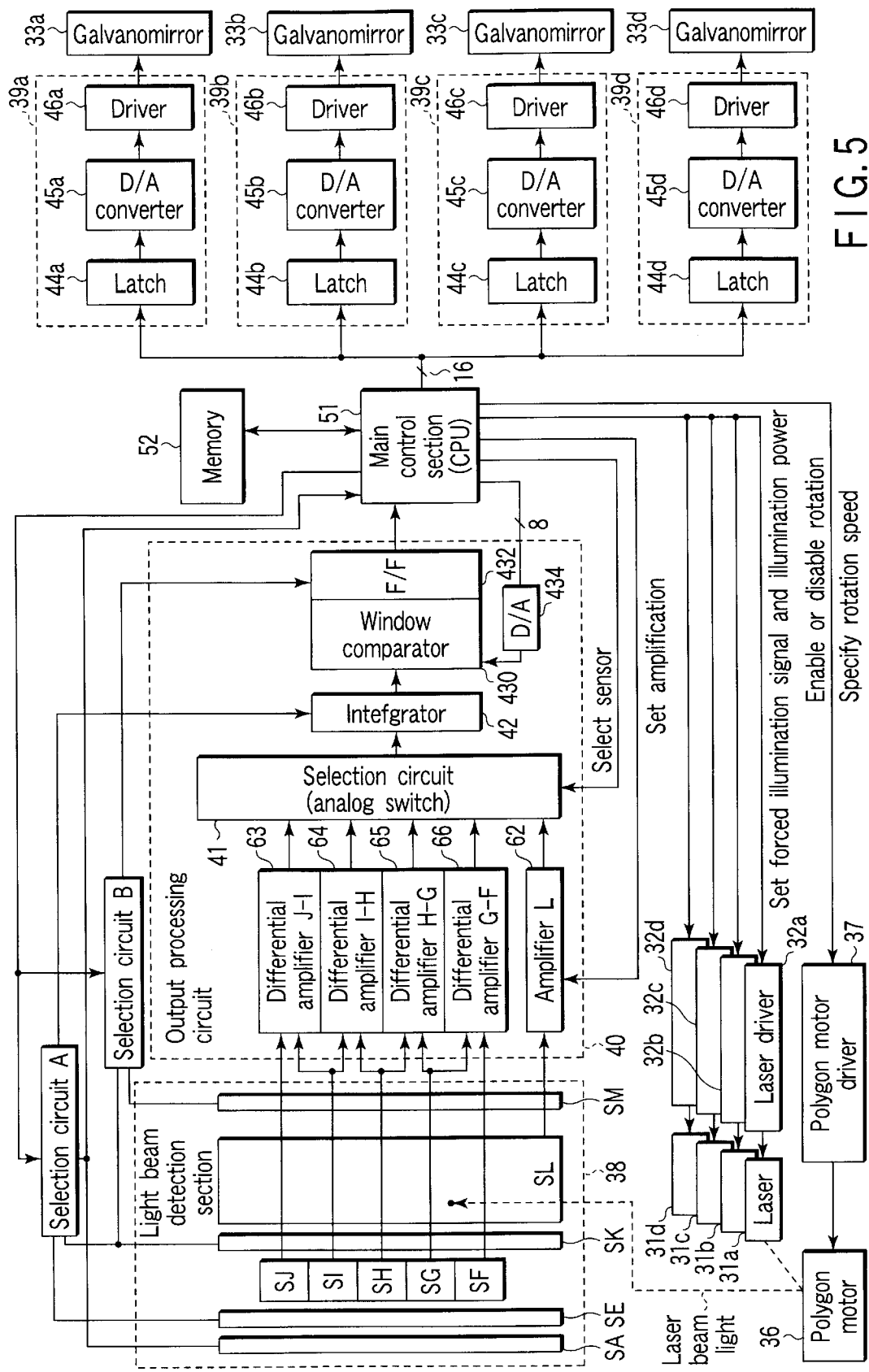
FIG. 5 illustrates the light beam passage position control.

FIG. 5 illustrates the light beam passage position control with reference to the photoconductor drum 15 in FIG. 2. FIG. 5 shows in detail the components in the block diagram of FIG. 4 associated with the light beam control.

The light beam detection section 38 includes the sensor patterns SA, SE, SK, and SM which are photodetectors comprising photodiodes. These sensor patterns generate pulse signals when a light beam passes (crosses) the sensor patterns.

A plurality of sensor patterns (photodetectors) SF through SJ generates an independent signal corresponding to the light beam passage position. When the light beam passes the sensor pattern SF, for example, the photodiode of the sensor pattern SF generates a pulse signal. When the light beam passes near the boundary between the sensor patterns SF and SG, the photodiodes of both sensor patterns SF and SG generate pulse signals Likewise, when the light beam passes near the boundary between the sensor patterns SI and SJ, the photodiodes of both sensor patterns SI and SJ generate pulse signals. When the light beam passes the sensor pattern SJ, for example, the photodiode of the sensor pattern SJ generates a pulse signal.

The sensor pattern (photodetector) SL generates an analog signal corresponding to the light volume (power) of four light beams passing there.

An amplifier 62 (amplifier L) amplifies a signal output from the photodiode of the sensor pattern SL at a specified amplification and supplies that signal to a selection circuit (analog switch) 41. The amplification of the amplifier L can be changed according to an instruction from the output control section 51.

A signal output from the photodiode of the sensor pattern SJ is supplied to one input of a differential amplifier 63 (differential amplifier J-I).

A signal output from the photodiode of the sensor pattern SI is supplied to the other input of the differential amplifier 63 (differential amplifier J-I) and to one input of a differential amplifier 64 (differential amplifier I-H).

A signal output from the photodiode of the sensor pattern SH is supplied to the other input of the differential amplifier 64 (differential amplifier I-H) and to one input of a differential amplifier 65 (differential amplifier H-G).

A signal output from the photodiode of the sensor pattern SG is supplied to the other input of the differential amplifier 65 (differential amplifier H-G) and to one input of a differential amplifier 66 (differential amplifier G-F).

A signal output from the photodiode of the sensor pattern SF is supplied to the other input of a differential amplifier 66 (differential amplifier G-F).

Namely, output signals from the photodiodes of the sensor patterns SF through SJ are respectively supplied to the differential amplifiers 63 through 66. Each differential amplifier outputs a difference between output signals from the adjacent sensor patterns SF through SJ.

The differential amplifier 63 amplifies a difference between output signals from the sensor patterns SJ and SI, and supplies the difference to the selection circuit (analog switch) 41.

Likewise, the differential amplifier 64 amplifies a difference between output signals from the sensor patterns SI and SH, and supplies the difference to the selection circuit (analog switch) 41. The differential amplifier 65 amplifies a difference between output signals from the sensor patterns SH and SG, and supplies the difference to the selection circuit (analog switch) 41. The differential amplifier 66 amplifies a difference between output signals from the sensor patterns SG and SF, and supplies the difference to the selection circuit (analog switch) 41.

The selection circuit 41 selects one of signals supplied by the sensor selection signal from the main control section (CPU) 51. The selection circuit 41 supplies the selected signal to an integrator 42. The integrator 42 integrates the signal selected by the selection circuit 41.

A selection circuit A is supplied with a pulse signal output from the photodiode of the sensor pattern SA, a pulse signal output from the photodiode of the sensor pattern SE, and a pulse signal output from the photodiode of the sensor pattern SK. According to an instruction from the main control section 51, the selection circuit A selects the pulse signal from the sensor pattern SA, SE, or SK, and supplies that signal to the integrator 42. The integrator 42 is configured to be reset by the supplied pulse signal and start integrating a signal supplied from the selection circuit 41.

Namely, the integrator 42 starts integration according to the arrangement of the sensor patterns (sensor photodetectors comprising photodiodes) SA, SE, and SK on the light beam detection section 38 in FIG. 3 and the passage timing of a light beam crossing these sensor patterns at a specified speed.

The integrator 42 provides effects of eliminating a noise, offsetting an influence of the slantwise installed light beam detection section 38, etc.

A selection circuit B is supplied with a pulse signal output from the photodiode of the sensor pattern SK and a pulse signal output from the photodiode of the sensor pattern SM. According to an instruction from the main control section 51, the selection circuit B selects the pulse signal from the sensor pattern SK or SM, and supplies that signal to a flip-flop circuit 432 (to be described). The flip-flop circuit 432 is configured to be clocked by the supplied pulse signal and performs a specified operation.

Namely, the flip-flop circuit 432 performs a flip-flop operation according to the arrangement of the sensor patterns (sensor photodetectors comprising photodiodes) SK and SM on the light beam detection section 38 in FIG. 3 and the passage timing of a light beam crossing these sensor patterns at a specified speed.

When a light beam passes the light beam detection section 38, a pulse signal from the sensor pattern SA, SE, or SK resets the integrator 42. While the light beam passes the sensor patterns on the light beam detection section 38, the integrator 42 integrates a signal indicative of light beam passage positions. An integrated result from the integrator 42 is actually A/D-converted by a circuit operation according to a looped configuration comprising a comparator 430, a flip-flop circuit 432, the main control section 51, and a DA converter 434. There is no need to use an ordinary A/D conversion device for converting an analog signal to a digital signal. (The circuit configuration and operations for this A/D conversion will be described later with reference to separate drawings.) The A/D conversion including the integration operation converts a signal detected by the light beam detection section 38 to a digital signal.

Here, the output processing circuit 40 comprises the amplifiers 62 through 66, the selection circuit 41, the integrator 42, the comparator 430, the flip-flop circuit 432, and the DA converter 434 for converting digital signals to analog signals.

A light beam's position detection signal from the light beam detection section 38 is converted to a digital signal. This signal is supplied as light beam's position information to the main control section 51. The main control section 51 determines the light beam passage position or the light beam volume (power) based on the light beam's position detection signal.

The main control section 51 computes control amounts for the galvanomirrors 33a through 33d based on the light beam's position detection signal obtained in this manner. A computation result is stored in the memory 52 as needed. The main control section 51 sends this computation result to the galvanomirror drive circuits 39a through 39d.

As shown in FIG. 5, the galvanomirror drive circuits 39a through 39d are provided with latches 44a through 44d for maintaining data for this computation result. Once data from the main control section 51 is written, the latches maintain that value until the data is updated next.

The data maintained in the latches 44a through 44d is converted to analog signals (voltages) in the D/A converters 45a through 45d and is supplied to the drivers 46a through 46d for driving the galvanomirrors 33a through 33d. The drivers 46a through 46d drive and control the galvanomirrors 33a through 33d according to analog signals (voltages) supplied from the D/A converters 45a through 45d.

The selection circuit 41 selects one of output signals from the sensor patterns SF through SJ. That signal is integrated and A/D processed. Because of this, output signals from the sensor patterns SF through SJ are not input to the main control section 51 at a time.

It may be difficult to determine where the light beam passes. In such a case, the main control section 51 allows the selection circuit 41 to sequentially supply output signals from all of the sensor patterns SF through SJ and determines the light beam passage position.

Once there is identified an approximate position where the light beam is passing, it is possible to estimate a position where the light beam is going to pass unless the galvanomirrors 33a through 34d are moved extremely. When the light beam passage position can be estimated, the main control section 51 need not always supply output signals from all of the sensor patterns SF through SJ.

FIG. 6 shows an example of a circuit configuration including the integrator 42 for processing a signal from the sensor pattern SL in the output processing circuit 40.

In FIG. 6, a current applied to the sensor pattern (photodiode) SL is amplified in an operational amplifier A3 as a current-voltage conversion circuit and is transmitted to the integrator 42 via an analog switch SW1. The integrator 42 comprises an operational amplifier A4, an integrating resistor R5, an integrating capacitor C, an analog switch SW7 for resetting the integrator 42, and a protective resistor R6.

An integration output Vo from the integrator 42 is transmitted to a window comparator 430. The window comparator 430 compares a threshold value Vr with the integration output Vo and sends a comparison result to the flip-flop circuit 432. To obtain the threshold value Vr, a DA converter (DAC) circuit 434 D/A-converts comparison reference data (digital) supplied from the main control section 51.

After a specified time from the start of integration, the flip-flop circuit 432 is set to the state corresponding to the comparison result from the window comparator 430. As a result, the flip-flop circuit 432 supplies a digital bit output to the main control section 51.

Based on an output signal from the flip-flop circuit 432, the main control section 51 appropriately corrects the comparison reference data and sends it to the DA converter circuit 434. The threshold value Vr for the window comparator 430 is corrected accordingly. Then, the window comparator 430 re-compares the integration output Vo with the threshold value Vr.

A loop from this comparison process to the correction of the threshold value Vr is repeated several times to regulate the comparison reference data (digital) from the main control section 51 to a content corresponding to the integration output Vo (analog).

Upon termination of the A/D conversion for the integration output Vo, a conversion termination signal is supplied to the main control section 51. When receiving the conversion termination signal, the main control section 51 stores the digital converted integration output Vo (e.g., information indicating the light beam volume).

As mentioned above, the configuration example in FIG. 6 includes the window comparator 430 which uses two threshold values WINTHH and WINTHL (a pair of comparison reference values).

Figure 7:
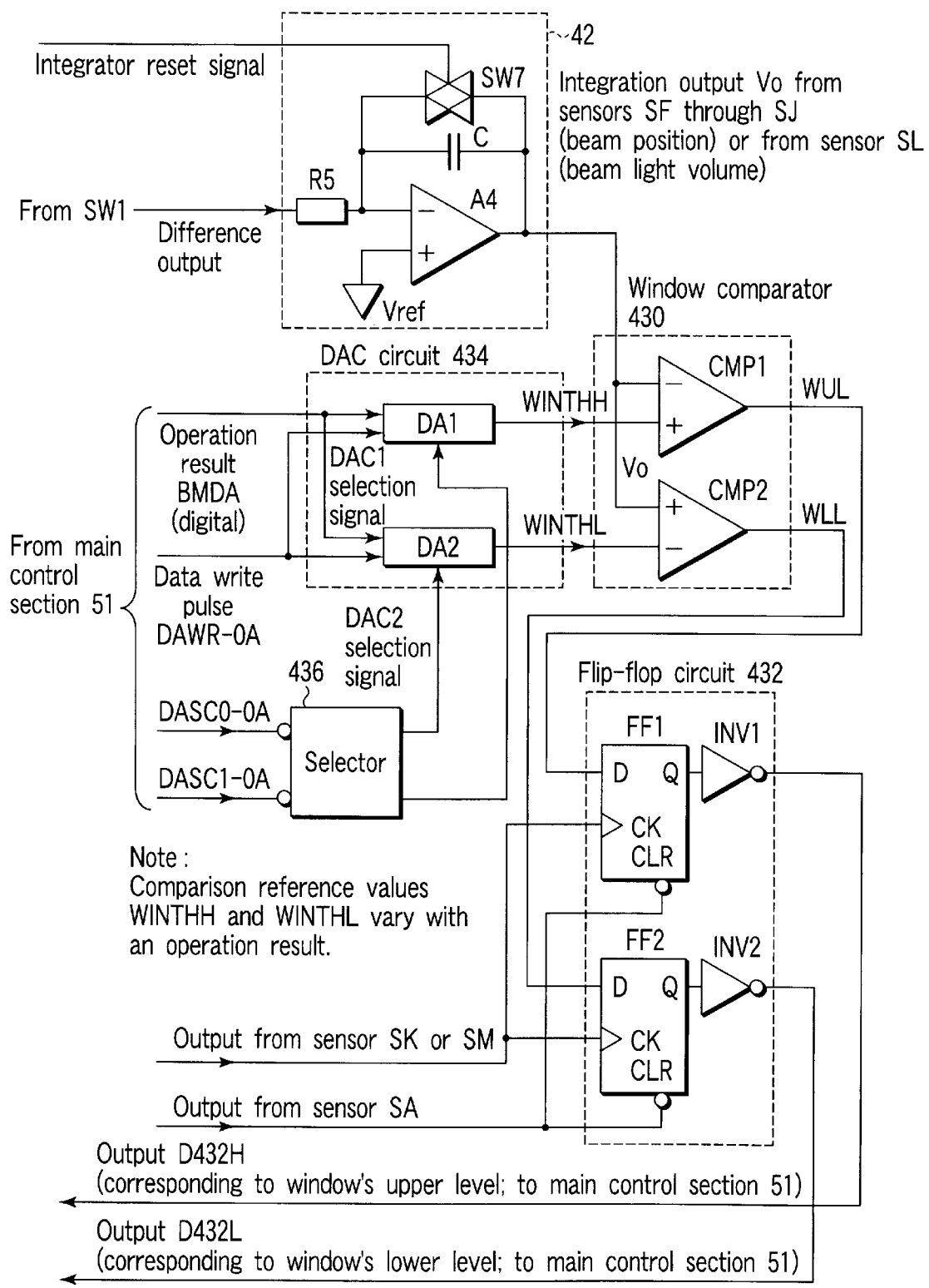
FIG. 7 shows an example of a circuit configuration in the vicinity of a window comparator.

FIG. 7 shows a circuit configuration example as a processing section for analog and digital signals using the window comparator 430.

According to the circuit configuration example in FIG. 7, when the light beam scans the sensor pattern SJ or its vicinity, the integration output Vo increases toward the positive side of the reference voltage Vref. When the light beam scans the sensor pattern SI or its vicinity, the integration output Vo increases toward the negative side of the reference voltage Vref.

When the integrator 42 in FIG. 7 is supplied with a signal output from the differential amplifier 63 in FIG. 5, the integrator 42 integrates analog voltages detected by the photodiodes of the sensor patterns SJ and SI shown in FIG. 3 or 5.

Likewise, when the integrator 42 is supplied with a signal output from the differential amplifier 64, the integrator 42 integrates analog voltages from the sensor patterns SI and SH. When the integrator 42 is supplied with a signal output from the differential amplifier 65, the integrator 42 integrates analog voltages from the sensor patterns SH and SG. When the integrator 42 is supplied with a signal output from the differential amplifier 66, the integrator 42 integrates analog voltages from the sensor patterns SG and SF.

The operational amplifier A4 of the integrator 42 may be supplied with a signal output from the amplifier 62 in FIG. 5 or the operational amplifier A3 in FIG. 6. In this case, the integration output Vo from the integrator 42 becomes an analog voltage representing the light beam volume (power) detected by the sensor pattern SL.

Consequently, the integration output Vo from the integrator 42 becomes an analog voltage corresponding to one or two of the detection results from the sensor patterns SF through SJ, and SL.

The CPU in the main control section 51 in FIG. 5 determines a plurality of threshold values by experimentally finding the interrelation between an actual light beam position on the light beam detection section 38 in FIG. 5 and the corresponding integration output Vo. The threshold values are stored in the memory 52 the CPU's internal memory (not shown) in FIG. 5.

The CPU in the main control section 51 is programmed so as to sequentially read the threshold values at a specified timing during the A/D conversion.

The integrator 42 in FIG. 7 is equivalent to the integrator 42 in FIG. 5 or 6 and is once reset by the edge of an integration reset signal from the selection circuit A in FIG. 5. The integrator 42 then integrates a signal (e.g., output from the amplifier 62 in FIG. 5) supplied via the selection circuit 41 with the time constant determined by a product of the resistor R5 and the capacitor C. This integration provides an analog voltage value free from a pulse noise or a high-frequency noise.

The obtained integration result Vo (analog voltage value for A/D conversion) is supplied to the window comparator (CMP1 and CMP2) 430 in FIG. 7.

Namely, the window comparator 430 comprises a pair of comparators CMP1 and CMP2. The integration result Vo from the integrator 42 is supplied to the negative input (−) of the comparator CMP1 and the positive input (+) of the comparator CMP2.

The positive input (+) of the comparator CMP1 is supplied with the comparison reference voltage WINTHH which determines the upper threshold value of the window comparator 430. The negative input (−) of the comparator CMP2 is supplied with the comparison reference voltage WINTHL which determines the lower threshold value of the window comparator 430.

The comparison reference voltages WINTHH and WINTHL determine the upper and lower threshold values (i.e., window comparator's window range) for the window comparator (CMP1 and CMP2) 430. The comparison reference voltages can be independently specified by using 10-bit D/A converters DA1 and DA2, for example.

When supplied with the comparison reference voltages WINTHH and WINTHL, the window comparator 430 checks if the integration output Vo is within, above, or below the window range of the window comparator 430 (between WINTHH and WINTHL). The window comparator 430 outputs a comparison result as a pair of WUL and WLL.

Figure 8:
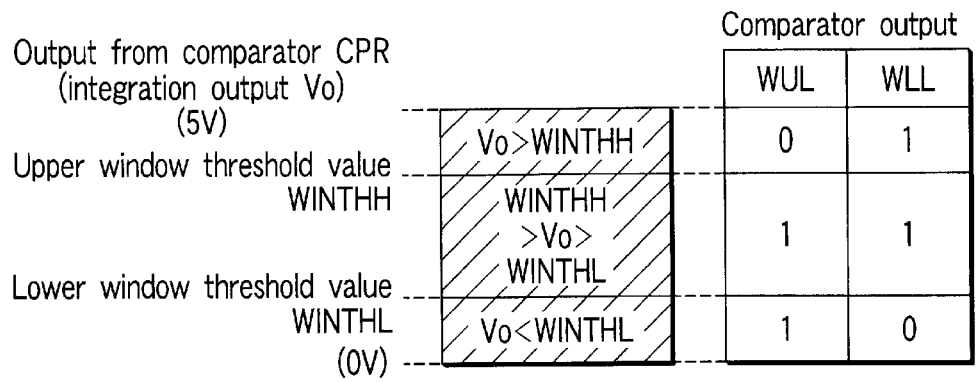
FIG. 8 shows relationship between an integration output and a window comparator output.

As shown in FIG. 8, when the integration output Vo is above the window of the window comparator 430, i.e., Vo>WINTHH, the output level WUL of the comparator CMP1 becomes "0" and the output level WLL of the comparator CMP2 becomes "1".

When the integration output Vo is within the window of the window comparator 430, i.e., WINTHH>Vo>WINTHL, the output level WUL of the comparator CMP1 becomes "1" and the output level WLL of the comparator CMP2 also becomes "1".

When the integration output Vo is below the window of the window comparator 430, i.e., Vo<WINTHL, the output level WUL of the comparator CMP1 becomes "1" and the output level WLL of the comparator CMP2 becomes "0".

The D/A converters DA1 and DA2 output the comparison reference voltages WINTHH and WINTHL for the window comparator 430. In this example, operations of the D/A converters DA1 and DA2 can be freely specified by combining DA selection signals DASC1-0A and DASC1-1A from the CPU of the main control section 51.

The following describes first, second, third, and fourth embodiments of the present invention applied to the above-mentioned optical unit (light beam scanning apparatus) 13.

The first embodiment is described below.

The first embodiment detects and controls a light beam by using a plurality of types of light volumes.

For example, let us assume that there is provided a constant light beam volume for detection and control. Then, the light beam's detection accuracy depends on circuit constants (integration constants, etc.) in the light beam detection section 38 and the output processing circuit 40 and on the A/D converter resolution. Accordingly, when the light beam volume is constant, it is possible to improve the light beam's detection accuracy by changing the circuit constants or using a high-accuracy A/D converter.

For example, decreasing the integration constant as a circuit constant increases the sensitivity to a light beam. However, decreasing the integration constant narrows a range of light beam detection, making the light beam control difficult. Using a high-accuracy A/D converter improves the light beam's detection accuracy. However, this also makes the light beam control difficult because the minimum resolution decreases and a voltage equivalent to the minimum resolution also decreases.

The first embodiment changes the light beam volume to improve the sensitivity of the light beam detection section 38 and the light beam's detection accuracy.

Figure 9:
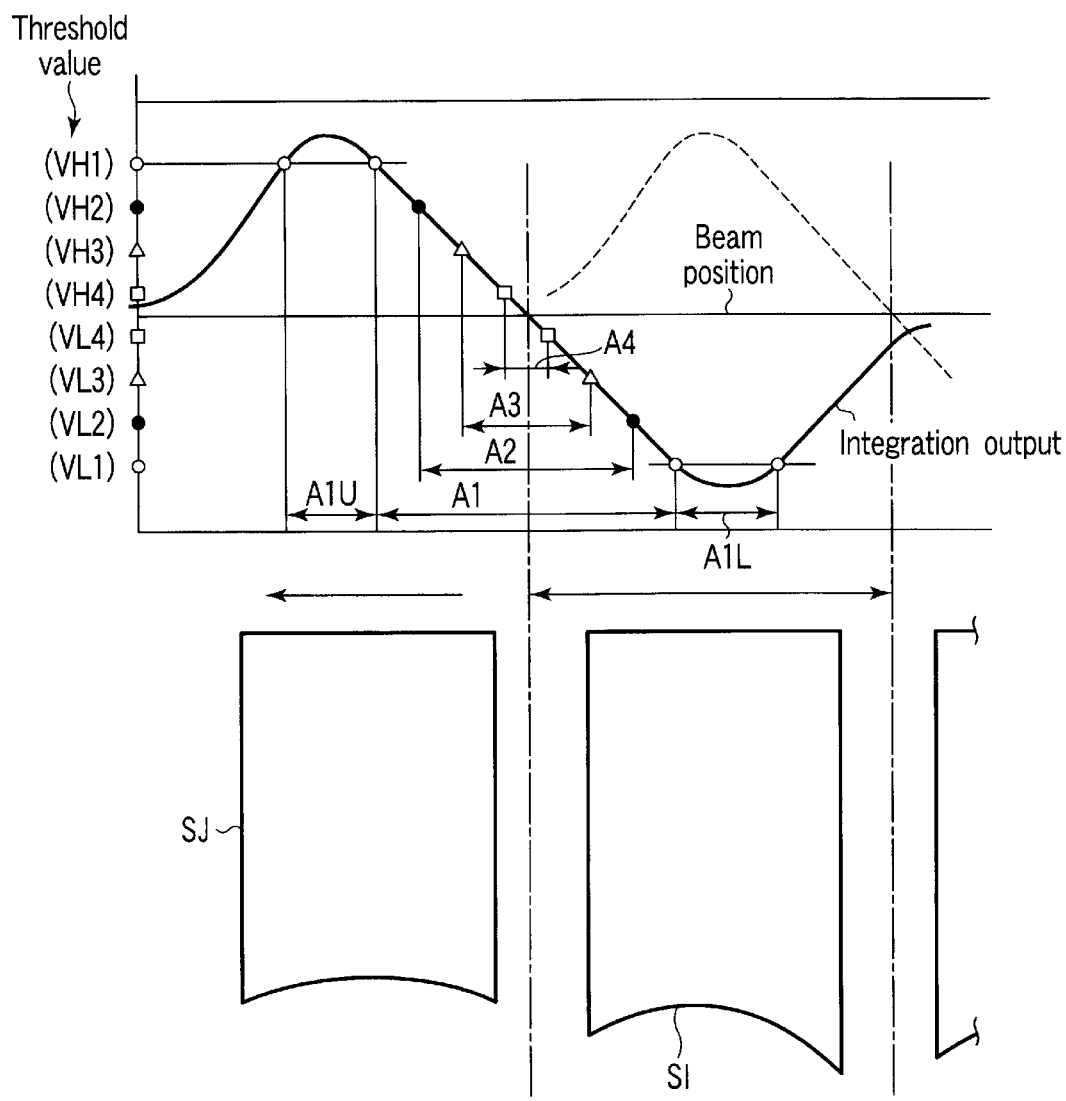
FIG. 9 shows relationship among a position of the light beam passing the light beam detection section, an integration output, and a window comparator's threshold value.

FIG. 9 shows relationship among a position of the light beam passing the light beam detection section 38, an associated integration output, and a threshold value of the window comparator 430 in FIG. 7.

In FIG. 9, it is assumed that the vertical axis represents an integration output (voltage) and the horizontal axis represents a light beam passage position. Further, it is assumed that the right-left direction in FIG. 9 corresponds to the up-down direction (vertical scan direction) of the sensor patterns SJ through SF and that a light beam passes in the vertical direction of the figure. FIG. 9 shows an example of integration outputs from the sensor patterns SJ and SI, one of pairs out of the sensor patterns SJ through SF.

When the light beam passes precisely the middle between the sensor patterns SJ and SI (i.e., within the narrowest window for the window comparator 430), there is no difference between the output signal from the sensor pattern SJ and that from the sensor pattern SI. In this case, the integration output Vo becomes the reference voltage Vref as shown in FIG. 9. When the light beam passage position relatively moves to the sensor pattern SI from the middle between the sensor patterns SJ and SI, the integration output Vo decreases. When the light beam passage position relatively moves to the sensor pattern SJ, the integration output Vo increases.

Namely, the integration output Vo for the sensor patterns SJ and SI varies with a change of the light beam passage position. The change in the integration output also applies to pairs of sensor patterns SI and SH, sensor patterns SH and SG, and sensor patterns SG and SF. Accordingly, detecting a voltage change in the integration output for each pair makes it possible to find a relative change of the light beam passage position against the sensor patterns SJ through SF.

For example, let us consider four pairs of window threshold values (VH1 and VL1, VH2 and VL2, VH3 and VL3, and VH4 and VL4) as windows for the window comparator 430. In this case, the four windows (threshold value pairs) gradually narrow in the order of the pairs VH1 and VL1, VH2 and VL2, VH3 and VL3, and VH4 and VL4. Namely, the light beam passage position can be estimated by detecting the narrowest window containing an integration output out of the four windows.

According to the circuit configuration in FIG. 7, for example, data BMDA for the comparison reference values is obtained as a pair of threshold values WINTHH and WINTHL for the window comparator 430 when an A/D operation terminates. If these values are equivalent to VH4 and VL4 in FIG. 9, the CPU of the main control section 51 determines that the light beam passage position corresponds to the middle (area A4 in FIG. 9) between the sensor patterns SI and SJ.

In FIG. 9, it is assumed that the middle between the sensor patterns SJ and SI is a target for controlling the light beam passage position. The middle between the sensor patterns SJ and SI corresponds to a position equivalent to the integration output Vref.

The circuit configuration in FIG. 7 uses a window-type comparator as a means for A/D-converting an integration output (analog voltage) from each of adjacent pairs out of the sensor patterns SJ through SF. Accordingly, the circuit configuration in FIG. 7 controls the light beam passage position so that an integration output for each pair is settled between the threshold values specified for the window comparator 430.

For example, let us consider how to set the light beam passage position to area A4 in FIG. 9 as the final target position. The light beam passage position is first adjusted to area A1, then to A2, A3, and finally to A4. In this manner, the light beam passage position is gradually adjusted to the area A4 as the final target position.

The circuit configuration in FIG. 7 limits the light beam passage position to the final target area by gradually narrowing the areas.

When controlling the light beam passage position as mentioned above, the areas A1, A2, A3, and A4 are defined by the window of the window comparator 430 between the upper threshold value WINTHH and the lower threshold value WINTHL. For example, the window of the window comparator 430 corresponds to the areas A1, A2, A3, and A4 as follows.

Area A1: (WINTHH, WINTHL)=(VH1, VL1)
Area A2: (WINTHH, WINTHL)=(VH2, VL2)
Area A3: (WINTHH, WINTHL)=(VH3, VL3)
Area A4: (WINTHH, WINTHL)=(VH4, VL4)

Here, the main control section 51 uses a 10-bit digital signal to set the threshold values (WINTHH and WINTHL) for the window comparator 430. In this case, the DA1 and the DA2 each comprise a 10-bit D/A converter. For this reason, one 10-bit digit is a minimum window width (difference between WINTHH and WINTHL) specifiable for the window of the window comparator 430. When an area corresponding to one 10-bit digit is assumed to have the width of 1 $\mu$m, it is possible to narrow the width of the area A4 as the final target position up to 1 $\mu$m. This circuit configuration provides the accuracy of up to 1 $\mu$m for detecting the light beam passage position.

In order to further improve the detection accuracy for this circuit configuration, the main control section 51 can use a 11-bit digital signal to set the threshold values (WINTHH and WINTHL) for the window comparator 430. In such a case, a high-resolution D/A converter needs to be used for the DA1 and DA2. When a 11-bit D/A converter is used for the DA1 and DA2, for example, the detection accuracy doubles. Namely, it is improved up to 0.5 μm. However, the difference between the threshold values for the window comparator 430 is halved. It is further requested to double the accuracy of the specifications for the protection against a noise in the entire circuit or for the circuit elements such as the operational amplifier etc. Using a high-performance operational amplifier and a high-resolution D/A converter improves the detection accuracy. Since these components are expensive, however, the entire circuit also becomes expensive.

The following describes how to improve the accuracy for detecting and controlling a light beam passage position in the vertical scan direction without using the expensive high-performance operational amplifier or high-resolution D/A converter and without changing the conventional circuitry. In the following description, the beam passage position is highly accurately detected by adjusting the beam to the area A4 as the final control target, then increasing the light beam volume for adjustment to improve the sensitivity of the beam detection section.

Figure 10:
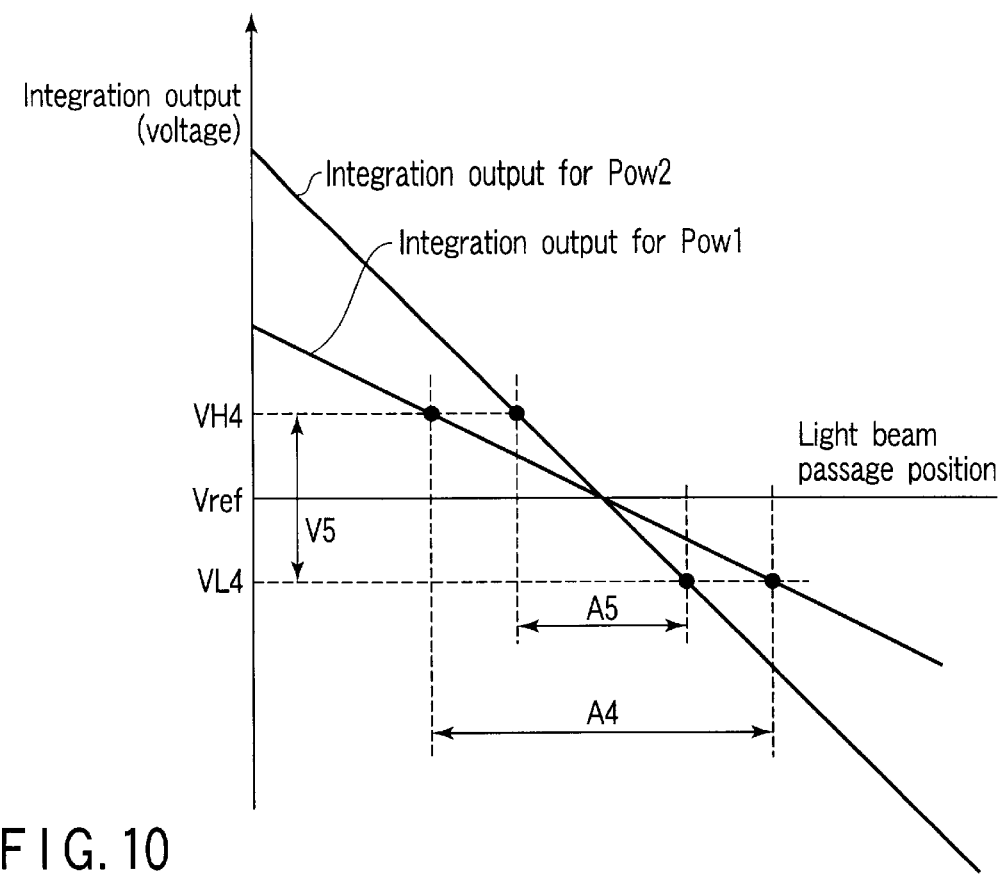
FIG. 10 shows an example of relationship among an amount of the light beam, a light beam passage position, and an integration output.
Figure 11:
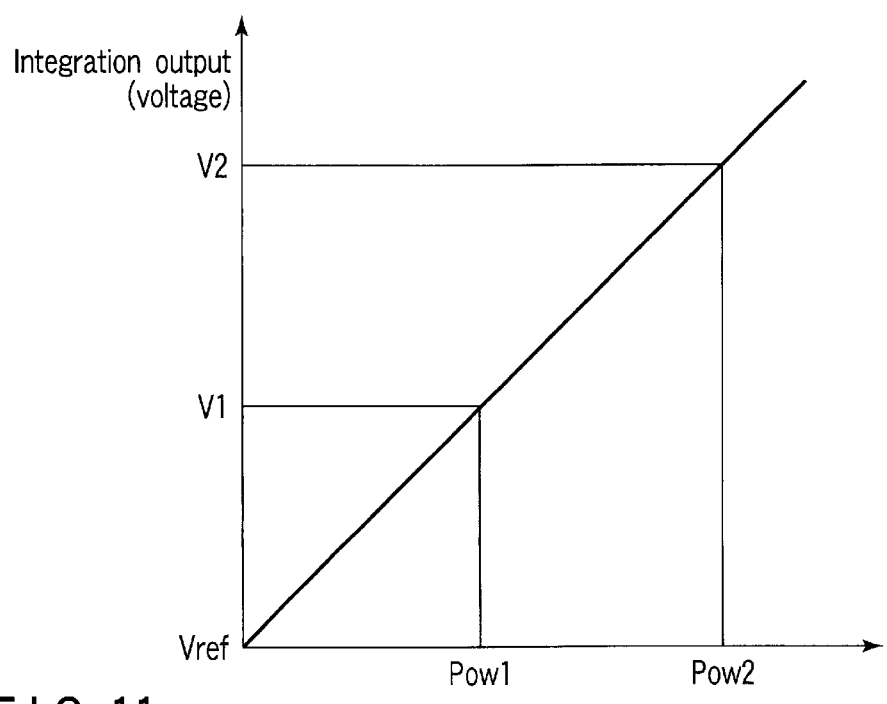
FIG. 11 shows an example of relationship among an amount of the light beam and an integration output.

FIG. 10 shows an example of relationship between a light beam passage position and an integration output (integration output characteristic) with reference to a light beam volume. FIG. 11 shows an example of relationship between a light beam volume and an integration output.

The sensor patterns SJ through SF generate an output signal according to the detected light beam volume. Consequently, the integration output increases or decreases in accordance with the light beam volume as shown in FIG. 11. The example in FIG. 11 shows the relationship between a light beam volume and an integration output so that the integration output is proportional to a change in the light beam volume. It may be also allowed to uniquely settle an integration output in accordance with the light beam volume.

When controlling a light beam passage position, the light beam volume is predetermined to a given value (Pow1 in FIG. 10) so as to provide the sensor patterns SJ through SF with a given sensitivity or ensure stability of the light beam control. When the light beam volume is Pow1, an integration output for the sensor patterns SJ and SI corresponds to the area A4 (first control target) in accordance with VH4 and VL4. When a 10-bit A/D converter is used for DA1 and DA2 as mentioned above, the window comparator 430 will have the minimum resolution of 1 μm.

Now, let us suppose to double the light beam volume as large as Pow1 (Pow2=Pow1×2). As shown in FIG. 10, an integration output for the sensor patterns SJ and SI corresponds to the area A5 (second control target) in accordance with VH4 and VL4. The area A5 occupies the center of the area A4 and is as half as the area A4.

Namely, the Vref position (the light beam passage position for Vref) is unchanged independently of the integration output characteristic for the light beam volume Pow2 and that for the light beam volume Pow1. The integration output characteristic for the light beam volume Pow2 causes the gradient twice as large as the integration output characteristic for the light beam volume Pow1. With respect to the minimum resolution of the window comparator 430, the voltage range is unchanged (V5), but the detection range for light beam passage positions becomes half. Namely, the light beam volume Pow2 doubles the accuracy for detection and control in comparison with Pow1.

While the example in FIG. 10 doubles the light beam volume, it may be preferable to use a light volume larger than the specified value. Namely, it is possible to improve the detection accuracy and the control accuracy by using a light beam having a light volume larger than the specified value for controlling the passage position. It is possible to further improve the accuracy of detecting and controlling light beam passage positions by gradually increasing the light volume for beam control, e.g., three times, four times, and so on.

The following describes an example of improving the accuracy of detecting and controlling light beam passage positions by varying light beam volumes.

Figure 12:
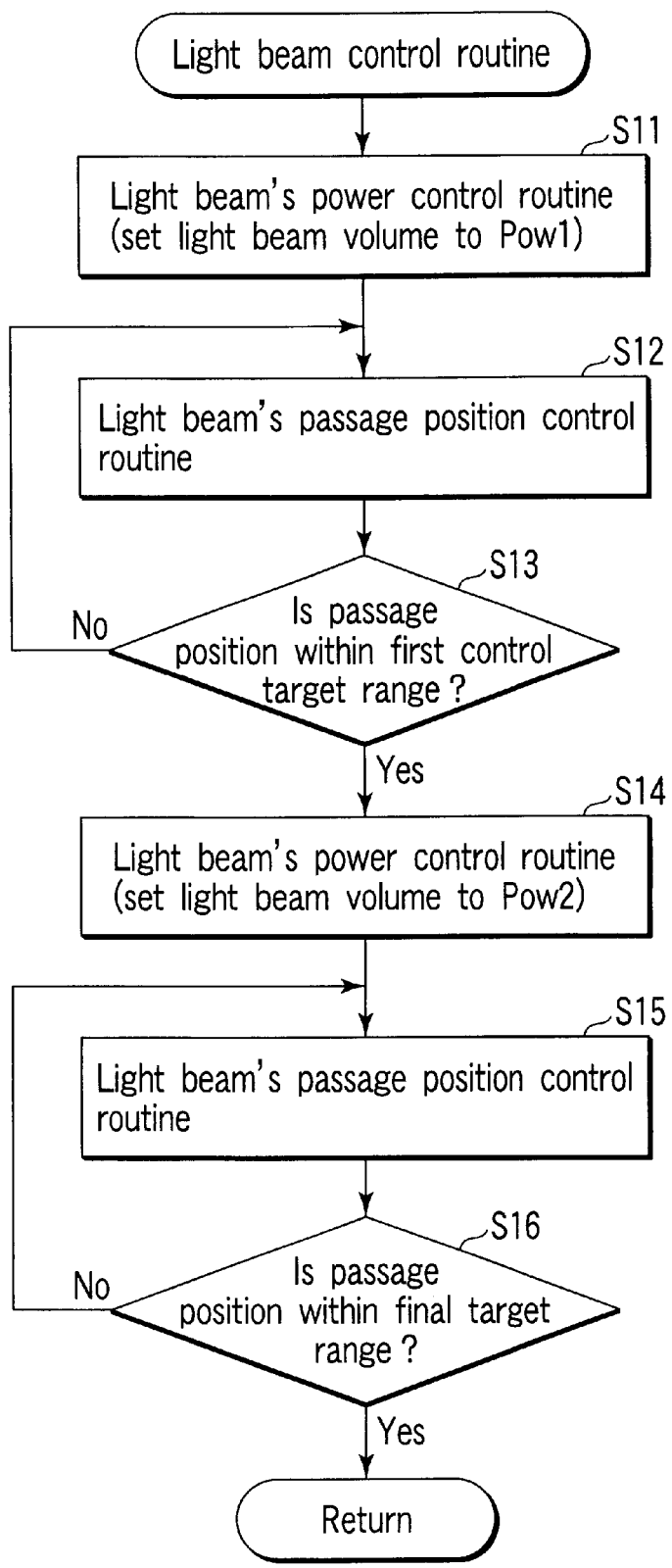
FIG. 12 is a flowchart showing an operation example of detecting a light beam passage position by using a plurality of types of light volumes.

FIG. 12 is a flowchart showing an operation example of detecting a light beam passage position by using a plurality of types of light volumes.

The main control section 51 first executes a light beam's power control routine to set the light beam volume to Pow1 as a specified light volume (step S11). According to the light beam's power control routine, the main control section 51 controls the laser oscillator so that the light beam volume is set to Pow1 based on a detection result from the power detection sensor SL.

When the light beam volume is set to Pow1, the main control section 51 executes a light beam's passage position control routine (step S12). The light beam's passage position control routine at step S12 controls the light beam passage position in the order of the areas A1, A2, A3, and A4, for example. The areas A1 through A4 are similar to those shown in FIG. 9. Namely, the areas A1 through A4 narrow in the order of the areas A1, A2, A3, and A4 centered about the area A4 as the first control target.

The main control section 51 first provides control so that the light beam passage position falls in the area A1 and the integration output falls in the window of the window comparator 430 (between VH1 and VL1).

When the light beam passage position is controlled to fall in the area A1, the main control section 51 provides control so that the light beam passage position falls in the area A2 and the integration output falls in the window of the window comparator 430 (between VH2 and VL2).

When the light beam passage position is controlled to fall in the area A2, the main control section 51 provides control so that the light beam passage position falls in the area A3 and the integration output falls in the window of the window comparator 430 (between VH3 and VL3).

When the light beam passage position is controlled to fall in the area A3, the main control section 51 provides control so that the light beam passage position falls in the area A4 and the integration output falls in the window of the window comparator 430 (between VH4 and VL4).

The light beam's passage position control routine controls to adjust the light beam passage position in the area A4 as the first control target (YES at step S13). The main control section 51 then executes the light beam's power control routine to set the light beam volume to Pow2 as the specified light volume (step S14). According to the light beam's power control routine, the main control section 51 controls the laser oscillator so that the light beam volume is set to Pow2 based on a detection result from the power detection sensor SL.

When the light beam volume is set to Pow2, the main control section 51 executes the light beam's passage position control routine (step S15). Since the light beam passage position is adjusted within the area A4 at step S12, the light beam's passage position control routine provides control at step S15 so that the light beam passage position falls in the area A5 as the final control target (second control target).

Namely, the main control section 51 first controls the integration output to fall in the window of the window comparator 430 (between VH4 and VL4) so that the light beam passage position falls in the area A5.

When the light beam passage position is controlled to fall in the area A5 (YES at step S16), the main control section 51 terminates the light beam's control routine.

As mentioned above, the light beam scanning apparatus according to the first embodiment controls a light beam passage position having the second light volume larger than the specified light volume so that the light beam passage position satisfies the final control target.

The light beam scanning apparatus according to the first embodiment uses the sensor which generates a signal corresponding to the detected light volume. The apparatus then adjusts a light beam passage position to the first control target having the specified range of output from the sensor in response to a light beam having the specified light volume. The apparatus further adjusts the light beam passage position to the second control target as the final control target having the above-mentioned range of output from the sensor in response to a light beam having a second light volume larger than the specified light volume.

Thus, it is possible to improve the accuracy for detecting and controlling a light beam passage position without using the expensive high-performance operational amplifier or high-resolution D/A converter and without changing the circuit configuration.

The second embodiment will now be described.

The second embodiment improves the accuracy for detecting and controlling a light beam passage position without being affected by an offset voltage in the circuit. Except the DA converter 434, the second embodiment described below has the same configuration as those shown in FIGS. 1 through 7 and a detailed description is omitted for simplicity.

First, operations of the circuit configuration in FIG. 7 are described.

Figure 13:
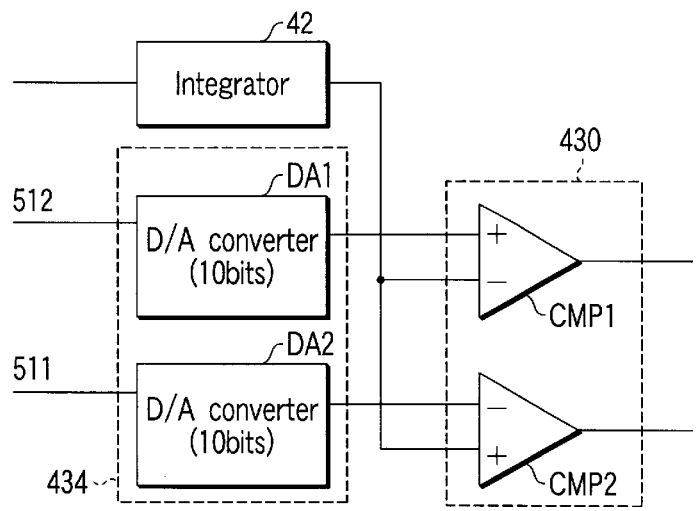
FIG. 13 shows signal transmission paths for the integrator, a DA converter circuit, and the window comparator.

FIG. 13 shows signal transmission paths for the integrator 42, the DA converter circuit 434, and the window comparator 430 in the circuit configuration of FIG. 7.

As shown in FIG. 13, a digital signal from the main control section 51 is converted to an analog signal in the D/A converters DA1 and DA2, and is supplied to the window comparator 430 according to the circuit configuration in FIG. 7. The digital signal from the main control section 51 provides the upper threshold value (WINTHH) and the lower threshold value (WINTHL) for the window comparator 430. These threshold values are converted to analog voltages in the D/A converters DA1 and DA2 respectively, and are supplied to the window comparator 430.

In the example of FIG. 13, the D/A converter DA1 converts a digital signal from the main control section 51 to an analog voltage. This digital signal indicates the upper threshold value (WINTHH). The upper threshold value (WINTHH) converted to the analog voltage is supplied to a comparator CMP1. Thus, the comparator CMP1 is provided with the upper threshold value (WINTHH). The D/A converter DA2 converts a digital signal from the main control section 51 to an analog voltage. This digital signal indicates the lower threshold value (WINTHL). The lower threshold value (WINTHL) converted to the analog voltage is supplied to a comparator CMP2. Thus, the comparator CMP2 is provided with the lower threshold value. The window comparator 430 checks if an integration output from the integrator 42 falls in the range (window) between the upper and lower threshold values.

The main control section 51 issues a digital signal indicating a threshold value. The threshold value is converted to an analog signal in the D/A converter DA1 or DA2, and is used as the threshold value for the window comparator 430. According to the circuit configuration as shown in FIG. 13, the main control section 51 can use one digit of a digital signal for the width (difference between WINTHH and WINTHL) of a minimum window specifiable for the window comparator 430.

Figure 14:
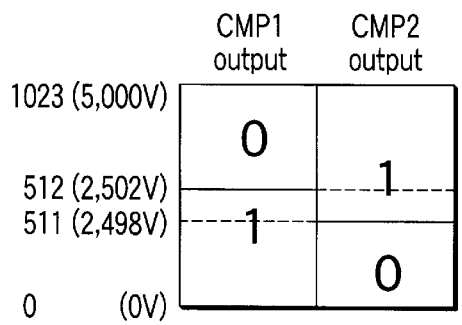
FIG. 14 shows an example of two threshold values specified for the window comparator and two actually specified values.

For example, let us assume that the main control section 51 uses a digital signal to set an upper threshold value to 512 (2.502V) and a lower threshold value to 511 (2.498V). In this case, the window width of the window comparator 430 is one digit (512–511). This value is the minimum window width the main control section 51 can specify for the window comparator 430. Here, the D/A converter DA1 converts 512 to 2.502V. The D/A converter DA2 converts 511 to 2.498V. Then, the window comparator 430 is provided with a window as shown in FIG. 14. When an integration output from the integrator 42 falls between 2.498 and 2.502V in the window of FIG. 14, both CMP1 and CMP2 output 1.

Generally, the D/A converter is provided at its output terminal with an operational amplifier (not shown) for buffering. The operational amplifier normally supplies an offset voltage. Accordingly, the D/A converter's output value may vary with an offset voltage from the operational amplifier for buffering provided at the output terminal of the D/A converter. Depending on the magnitude of an offset voltage, the D/A converters DA1 and DA2 may not be able to supply an analog voltage equivalent to a difference of 1-digit digital signal.

Figure 15:
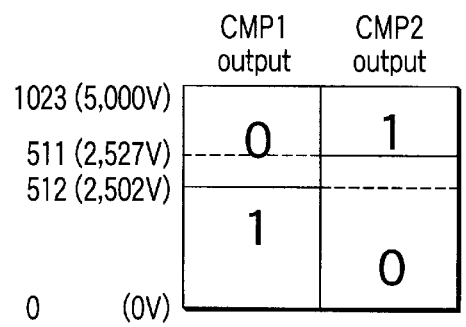
FIG. 15 shows an example of two threshold values specified for the window comparator and two actually specified values.

In the example of FIG. 15, like FIG. 14, it is assumed that the main control section 51 supplies an upper threshold value of 512 to the D/A converter DA1 and a lower threshold value of 511 to the D/A converter DA2. Here, the D/A converter DA1 is assumed to be subject to no effect of the offset voltage. The D/A converter DA2 is assumed to be subject to +30 mV at output due to the offset voltage.

In this case, the D/A converter DA1 outputs an analog voltage of 2.527V equivalent to value 512 for the digital signal. The D/A converter DA2 outputs an analog voltage of 2.527V, i.e., a sum of 2.498V equivalent to value 511 for the digital signal and +0.030V of the offset voltage. Namely, this reverses the magnitude relationship between the upper threshold value output from the D/A converter DA1 and the lower threshold value output from the D/A converter DA2.

When the D/A converter DA2 is given an offset voltage of +30 mV as mentioned above, the threshold value of 2.502V is set to the CMP1 and the threshold value of 2.527V is set to the CMP2 as shown in FIG. 15. In this case, when an integration output falls between 2.502 and 2.527V, for example, both CMP1 and CMP2 output 0. This is an impossible result for a digital signal setting value because the output is above the upper threshold value and below the lower threshold value. The result is incapable of A/D conversion. The window comparator 430 causes an output error.

To avoid an output error due to the D/A converter's offset voltage, a possible solution is to provide a threshold value considering the offset voltage for each of the D/A converters DA1 and DA2. For this purpose, however, it is necessary to provide at least one digit plus a difference for the offset voltage.

For example, it is assumed that the D/A converter DA2 has a possibility of causing an offset voltage of ±30 mV as shown in FIG. 14. Then, a difference between the upper and lower threshold values must be set to at least 0.002V (a difference for one digit) plus 30 mV or more. Such a threshold value difference may remarkably degrade the minimum resolution. This is impractical.

As the second embodiment, the following describes a circuit configuration example which prevents a decision error due to an offset voltage without decreasing the minimum resolution. The second embodiment describes a DA converter 434a which substitutes a single D/A converter DA3 in FIG. 16 for the D/A converters DA1 and DA2 in FIG. 13.

Figure 16:
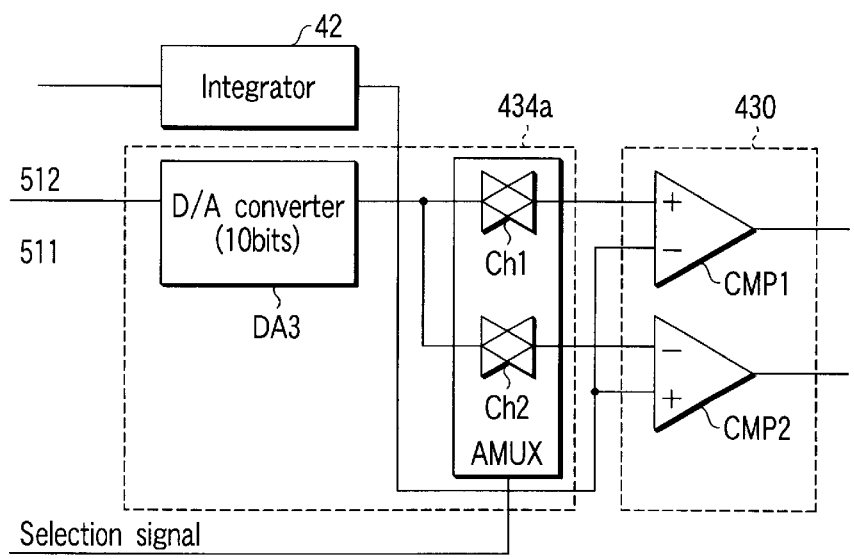
FIG. 16 shows a circuit configuration of the integrator, the DA converter circuit, and the window comparator as a second embodiment.

According to the circuit configuration in FIG. 16, the common D/A converter DA3 sets the upper threshold value supplied to the comparator CMP1 and the lower threshold value supplied to the comparator CMP2. Outputs from the D/A converter DA3 are respectively connected to input terminals of the comparator CMP1 and CMP2 via an analog multiplexer AMUX (Ch1 and Ch2).

The D/A converter DA3 is common to the comparator CMP1 and CMP2. Accordingly, the offset voltage of the D/A converter DA3 equally affects the upper and lower threshold values. This prevents inversion of the size relationship between the upper and lower threshold values. If the D/A converter DA3 contains an offset voltage of 30 mV, for example, the offset voltage size is equally applied to output to the CMP1 and output to the CMP2. Accordingly, the resolution can be obtained as designed by eliminating an effect of the D/A converter's offset voltage.

If the common D/A converter is used, the main control section 51 cannot simultaneously incorporate outputs from the comparators CMP1 and CMP2. To solve this, the main control section 51 uses a selection signal to switch the analog multiplexer AMUX (Ch1 and Ch2) so that the comparator CMP1 is provided with an upper threshold value and the comparator CMP2 is provided with a lower threshold value.

The following describes operations in the circuit configuration in FIG. 16.

Figure 17:
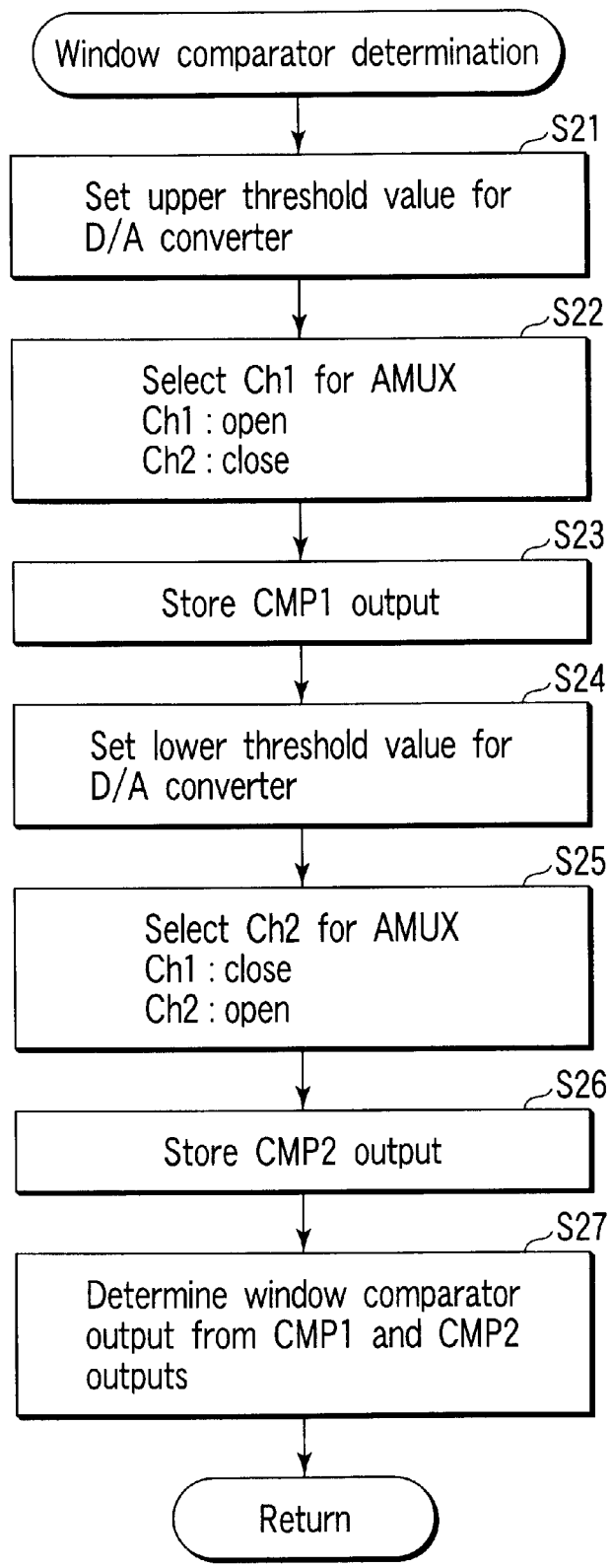
FIG. 17 is a flowchart for explaining an operation example of the circuit shown in FIG. 16.

FIG. 17 is a flowchart for explaining an operation example of the circuit configuration shown in FIG. 16.

First, the main control section 51 compares the upper threshold value with an integration output. Namely, the main control section 51 sends a digital signal indicating the upper threshold value to the D/A converter DA3 (step S21). According to the example in FIG. 16, the main control section 51 sends value 512 (2.502V) as the upper threshold value to the D/A converter DA3. The D/A converter DA3 outputs 2.502V+ the offset voltage.

When sending the digital signal indicating the upper threshold value to the D/A converter DA3, the main control section 51 sends a selection signal for selecting Ch1 to the analog multiplexer AMUX (step S22). When receiving the selection signal for selecting Ch1, the analog multiplexer AMUX opens the Ch1 and closes the Ch2.

The DA converter circuit 434a supplies the positive terminal of the comparator CMP1 with an analog voltage to which the D/A converter DA3 has converted the upper threshold value. The negative terminal of the comparator CMP1 is supplied with an integration output from the integrator 42. Consequently, the comparator CMP1 outputs a result of comparing the integration output with the upper threshold value. For example, when the integration output is greater than the upper threshold value, the comparator CMP1 outputs 0. When the integration output is smaller than the upper threshold value, the comparator CMP1 outputs 1.

An output value (D432H) from the comparator CMP1 is supplied to the main control section 51 via the F/F circuit 432. The main control section 51 stores the output value (D432H) from the comparator CMP1 in the memory 52 (step S23). After storing the output value (D432H) from the comparator CMP1 in the memory 52, the main control section 51 terminates the comparison between the upper threshold value and the integration output, and then compares the lower threshold value.

Namely, after storing the output value (D432H) from the comparator CMP1 in the memory 52, the main control section 51 sends a digital signal indicating the lower threshold value to the D/A converter DA3 (step S24). According to the example in FIG. 16, the main control section 51 sends value 511 (analog voltage of 2.498V) as the upper threshold value to the D/A converter DA3. The D/A converter DA3 outputs 2.498V+ the offset voltage.

When sending the digital signal indicating the lower threshold value to the D/A converter DA3, the main control section 51 sends a selection signal for selecting Ch2 to the analog multiplexer AMUX (step S25). When receiving the selection signal for selecting Ch2, the analog multiplexer AMUX closes the Ch1 and opens the Ch2.

The DA converter circuit 434a supplies the negative terminal of the comparator CMP2 with an analog voltage to which the D/A converter DA3 has converted the lower threshold value. The positive terminal of the comparator CMP2 is supplied with an integration output from the integrator 42. Consequently, the comparator CMP2 outputs a result of comparing the integration output with the lower threshold value. For example, when the integration output is smaller than the lower threshold value, the comparator CMP2 outputs 0. When the integration output is greater than the lower threshold value, the comparator CMP2 outputs 1.

An output value (D432L) from the comparator CMP2 is supplied to the main control section 51 via the F/F circuit 432. The main control section 51 stores the output value (D432L) from the comparator CMP2 in the memory 52 (step S26). After storing the output value (D432L) from the comparator CMP2 in the memory 52, the main control section 51 terminates the comparison between the lower threshold value and the integration output.

Upon completion of the comparison between the upper threshold value and the integration output and between the lower threshold value and the integration output, the main control section 51 compares the integration output with the window of the window comparator 430. Namely, based on the output value (D432H) from the comparator CMP1 and the output value (D432L) from the comparator CMP2, the main control section 51 examines a result of comparing the integration output with the window of the window comparator 430.

For example, when D432H is 1 and D432L is 1, the main control section S1 determines that the integration output falls in the window of the window comparator 430. When D432H is 1 and D432L is 0, the main control section 51 determines that the integration output is below the window of the window comparator 430. When D432H is 0 and D432L is 1, the main control section 51 determines that the integration output is above the window of the window comparator 430.

As mentioned above, the second embodiment can provide the resolution as designed without being affected by an offset voltage of the D/A converter which supplies threshold values for the window comparator 430.

The third embodiment will now be described.

The third embodiment relates to a light beam shape and the size of a sensor pattern for detecting the light beam.

Except shapes of the sensor patterns SJ through SF, the third embodiment described below has the same configuration as those shown in FIGS. 1 through 7 and a detailed description is omitted for simplicity. The following describes a pair of sensor patterns SJ and SI out of the sensor patterns SJ through SF. The description also applies to the other pairs such as the sensor patterns SI and SH, SH and SG, and SG and SF.

FIG. 17 shows an example of relationship among a light beam and sensor patterns SJ and SI in FIG. 3 for detecting a light beam passage position.

As shown in FIG. 3, the sensor patterns SJ and SI are arranged adjacently to each other. The sensor patterns SJ and SI detect a light beam passage position and comprise a photodiode, etc. The sensor patterns SJ and SI output a signal whose intensity corresponds to the light beam volume. The integrator 42 integrates a difference between an output from the sensor pattern SJ and an output from the sensor pattern SI. The light beam passage position is determined based on an integration output from the integrator 42.

The light beam volume detected by the sensor patterns SJ and SI is used to verify an integration output indicating the light beam passage position. Accordingly, the sensor patterns SJ and SI verify a centrobaric position of the entire detected light beam irrespectively of a light beam shape.

Figure 18:
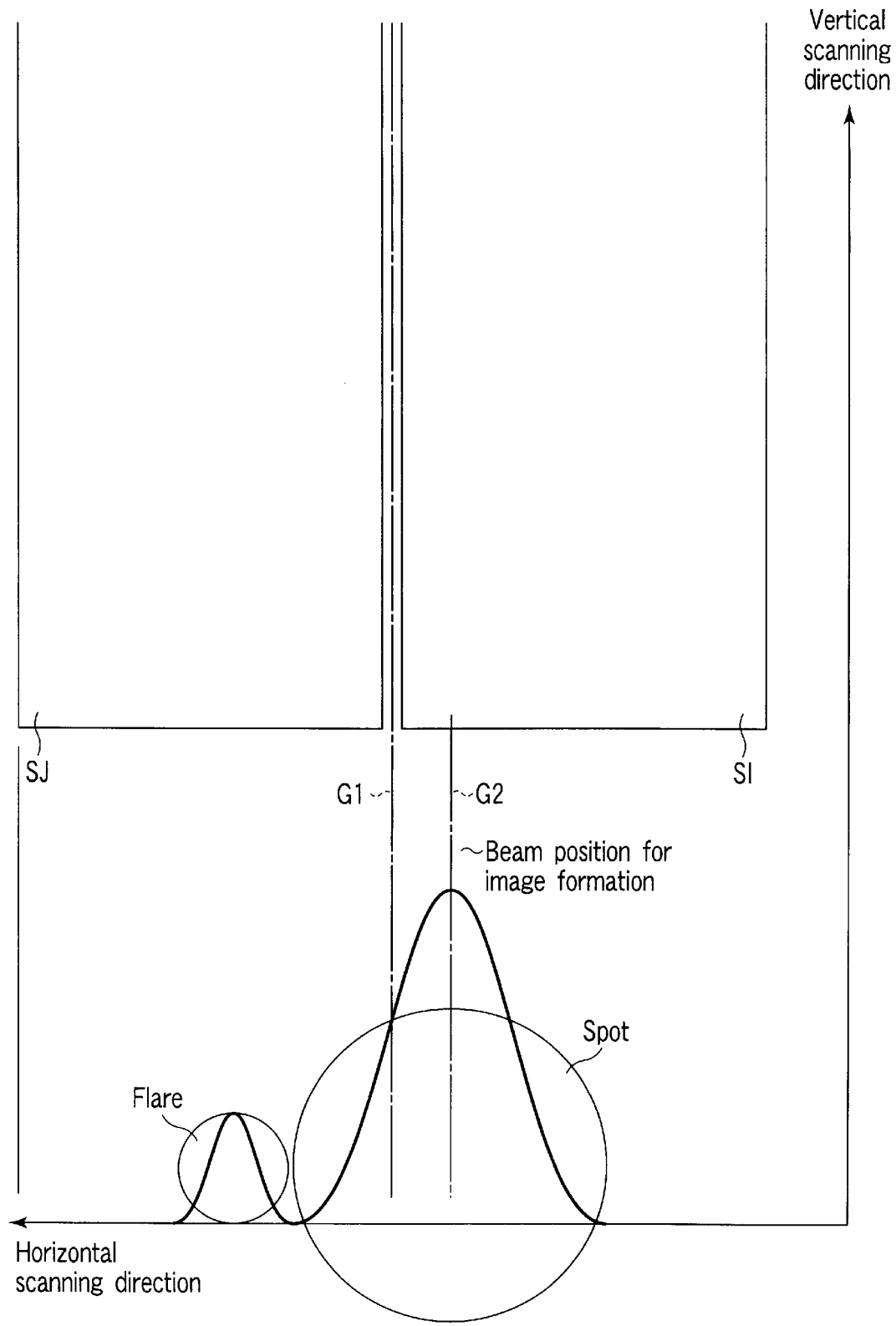
FIG. 18 shows an example of a light beam's spot and a flare generated near the spot.

As shown in FIG. 18, for example, the light beam may cause a flare (flare light) near a spot (spot light) for image formation. The spot actually forms an image. Namely, an image is formed at the center (peak position) of the spot. The flare occurs due to adjustment conditions etc. in the optical system. The flare has no effect on an image formed by the light beam. It is very difficult to completely eliminate the flare by adjusting the optical system etc. Accordingly, the light beam needs to be adjusted with the flare included.

The example in FIG. 18 shows a flare to the left of the spot. The flare has the light volume approximately 20% of the original light beam. As shown in FIG. 18, when the sensor pattern SJ is wide enough to detect a flare component as well, the sensor pattern SJ detects not only a spot component of the light beam, but also the flare component. In this case, the light beam's centrobaric position deviates from the spot center by the flare. Even if there is misalignment between the light beam's centrobaric position and the spot center, the main control section 51 detects the light beam passage position by the centrobaric position. Accordingly, a difference occurs between the light beam position (light beam's centrobaric position) controlled by the main control section 51 and the position (spot center) for an image formed by the light beam. As a result, the image formation apparatus using such light beam scanning apparatus causes misalignment between the light beam control position and an actually formed image.

The example in FIG. 18 shows that the light beam's control target (control position) is the center between SJ and SI, i.e., position G1. As shown in FIG. 18, however, the light beam causes a flare component. The laser beam's centrobaric position shifts to position G2 by the flare. The main control section 51 detects the light beam passage position by the light beam's centrobaric position. The light beam is controlled so that its centrobaric position coincides with the position G1. For this reason, the light beam's peak position (spot center) is aligned to the position G2 deviated from the position G1 though it should be aligned to the position G1.

The following describes a sensor pattern as the third embodiment. The third embodiment limits the sensor pattern size in the vertical scan direction so as to exclude the light beam's flare component.

Figure 19:
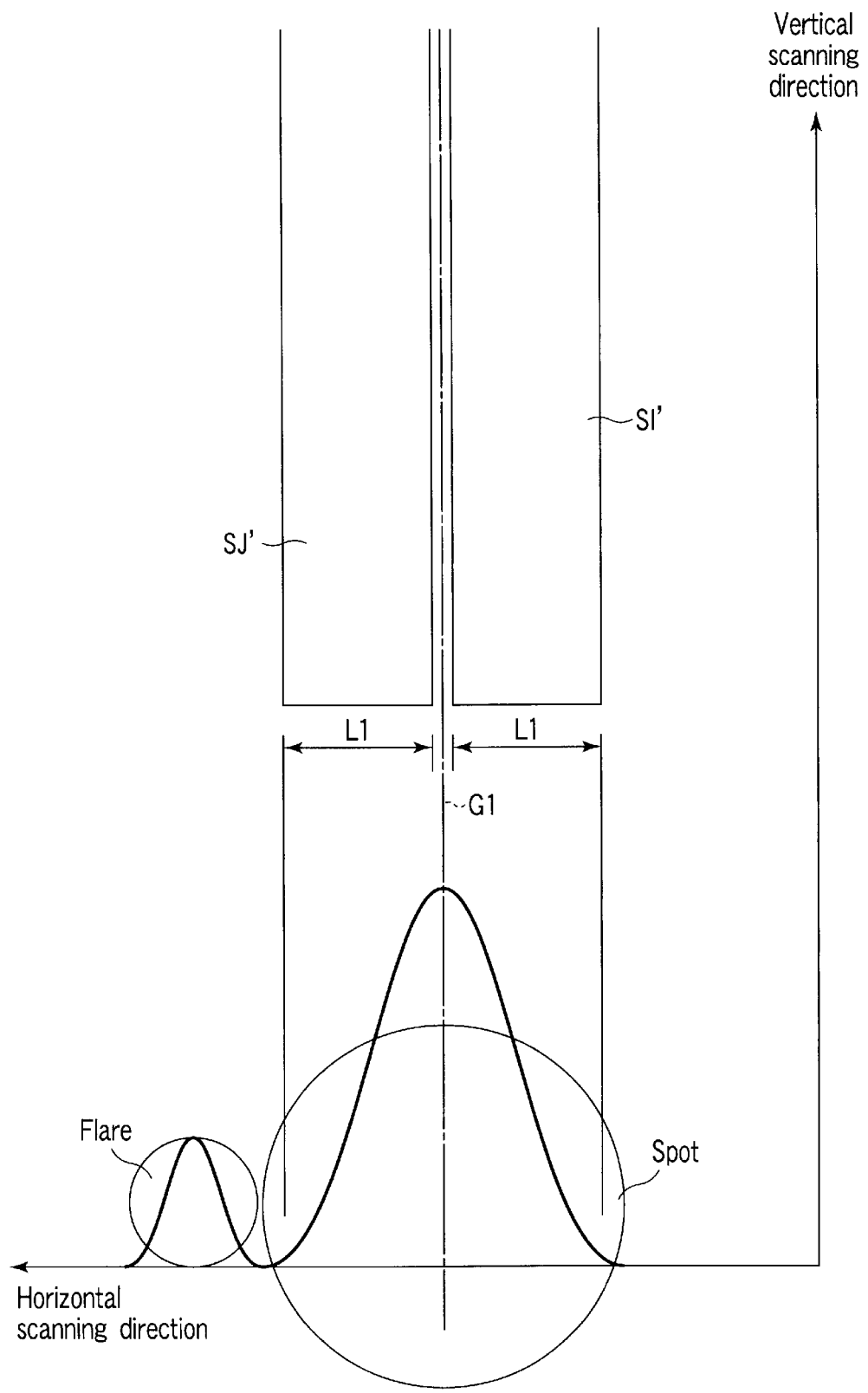
FIG. 19 shows a configuration example of the sensor according to a third embodiment.

FIG. 19 shows the relationship between sensor patterns and a light beam shape. The example in FIG. 19 shows the relationship between a light beam having the shape similar to that in the example of FIG. 18 and the sensor patterns SJ and SI. The sensor patterns SJ and SI in FIG. 19 have such a width in the vertical scan direction as to exclude the light beam's flare.

When the center of the light beam spot is positioned in the middle of the sensor patterns SJ and SI according to the configuration example in FIG. 19, a light beam's flare component is not detected. When the light beam's centrobaric position is determined by a detection result according to the sensor patterns SJ and SI as shown in FIG. 19, no misalignment occurs between the centrobaric position and the light beam's peak position. Namely, the light beam's peak position can be controlled by controlling the light beam's centrobaric position based on a detection result from the sensor patterns SJ and SI. This detection result is equivalent to a difference between output from the sensor pattern SJ and output from the sensor pattern SI.

For example, the sensor patterns SJ and SI are assumed to have the width based on the diameter of the light beam spot. Normally, the light beam spot is adjusted to form a given size at the focus position. That is, the sensor patterns SJ and SI are configured to have a width smaller than or equal to the light beam spot diameter in the vertical scan direction. When the light beam spot center (light beam's peak position) corresponds to the middle of the sensor patterns SJ and SI in this configuration, the sensor patterns SJ and SI detect only light at the light beam spot. Even if the flare component overlaps the spot, there is a little difference between the spot center and the light beam's centrobaric position detected by the sensor patterns SJ and SI. This is because the light volume of the flare component is smaller than that of the light beam's spot component. There is a little effect of the flare component's light volume.

In this manner, the sensor patterns SJ and SI can detect the centrobaric position of the light beam spot without detecting the light beam's flare component.

As mentioned above, the sensors to detect a light beam passage position are configured to have such a width in the vertical scan direction as to exclude a flare caused by the light beam. This eliminates misalignment between the centrobaric position of a light beam to be controlled and the spot center thereof. It is possible to prevent a difference between the light beam's control position and the position of the light beam to form an image.

The fourth embodiment will now be described.

The fourth embodiment detects the most likely passage position of a light beam even if the light beam passage position vibrates. The light beam scanning apparatus according to the fourth embodiment described below has the same configuration as those shown in FIGS. 1 through 7 and a detailed description is omitted.

A light beam scans a scan surface by means of the polygon mirror 35. The polygon mirror 35 comprises eight mirrors, for example. The polygon motor 36 rotates the polygon mirror 35. Each surface of the polygon mirror 35 scans the light beam in the horizontal scan direction. Each mirror of the polygon mirror 35 is so designed as to allow the light beam to scan a specified position. However, an angle of each mirror against the rotating shaft may slightly deviate (polygon mirror misalignment). Misalignment of the polygon mirror 35, if any, varies the light beam passage position scanned on each surface of the polygon mirror 35.

The light beam scanning apparatus is installed in an image formation apparatus or the like which generates slight vibrations due to a photoconductor drum, a developing unit's drive section, various motors, gears, etc. These vibrations may be transmitted to the optical unit 13 from the image formation apparatus. In this case, the light beam's scan position may vibrate.

Figure 20:
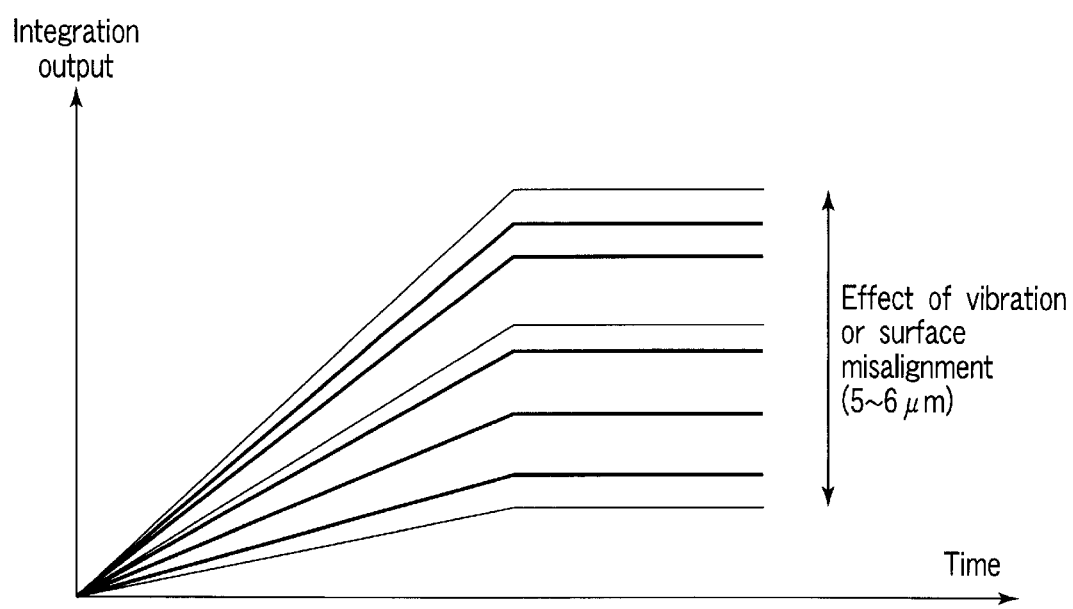
FIG. 20 shows an example of an integration output when scanning the light beam for a plurality of lines.

When the polygon mirror misalignment occurs, for example, different light beam passage positions (vertical scan direction) are scanned on the respective surfaces of the polygon mirror 35. Consequently, a beam passage position detection sensor for detecting the light beam generates different outputs (integration outputs) on the respective surfaces of the polygon mirror 35 as shown in FIG. 20. Generally, the polygon mirror misalignment causes a variation of approximately 5 to 6 μm for the light beam passage position. When the light beam passage position varies approximately 5 to 6 μm, an error of 5 to 6 μm is contained in the light beam passage position detected by the integration output. When a vibration from the image formation apparatus fluctuates the light beam passage position, an error is also contained in the light beam passage position detected by the integration output.

When the light beam passage position fluctuates, the main control section 51 cannot detect the beam passage position correctly. An ordinary light beam scanning apparatus aligns the light beam passage position within an allowable range against the intended target position based on a detection result from the beam passage position sensor. When the allowable range is assumed to be ±1 μm against the target position, for example, the light beam passage position is aligned within the allowable range for the target position.

When the light beam passage position fluctuates in excess of the allowable range for the target position, the light beam passage position does not fall in this range. When the light beam passage position's fluctuation exceeds the allowable range for the target position, the light beam scanning apparatus cannot detect or control the light beam passage position.

Even if the light beam passage position fluctuates due to the polygon mirror misalignment or a vibration from the image formation apparatus, the fourth embodiment detects the most likely light beam passage position. Namely, the fourth embodiment detects the light beam passage position based on an amplitude of fluctuation (vibration) of the light beam scanned by the polygon mirror 35.

The following describes the polygon mirror misalignment as an example of the fourth embodiment.

The fourth embodiment determines a light beam passage position based on integration outputs of a plurality of scans for that position.

Let us assume that each surface of the polygon mirror 35 scans a light beam to generate integration outputs BP1 through BPn, where n is the number of polygon surfaces. Of the integration outputs BP1 through BPn, the maximum value is assumed to be BPmax and the minimum value to be BPmin.

Then, a fluctuation amplitude for the integration outputs BP1 through BPn can be expressed by a difference between the maximum value BPmax and the minimum value BPmin (BPmax−BPmin). An intermediate value between BPmax and BPmin is calculated by (BPmax+BPmin)/2. This center value is an integration output indicating the center position of the vibration amplitude for the light beam passage position. Accordingly, the main control section 51 can detect the center of the vibration amplitude for the light beam passage position by determining this position based on that center value.

When the polygon mirror 35 comprises eight mirrors, for example, the main control section 51 determines the maximum and minimum values based on integration outputs BP1 through BP8 for the light beam scanned on each surface. When the maximum value BPmax is BP1 and the minimum value BPmin is BP2, the main control section 51 determines an integration output corresponding to the light beam passage position by using the following equation.

Integration output corresponding to the light beam passage position=$(BP1+BP2)/2$ The main control section 51 determines the light beam passage position based on the calculated integration output corresponding to that position.

It may be preferable to use an average of the integration outputs BP1 through BP8 as an integration output corresponding to the light beam passage position for determining this position. In this case, the integration output corresponding to the light beam passage position is found by $(BP1+BP2 \ldots +BPn)/n$.

The following describes an example of operations according to the fourth embodiment.

Figure 21:
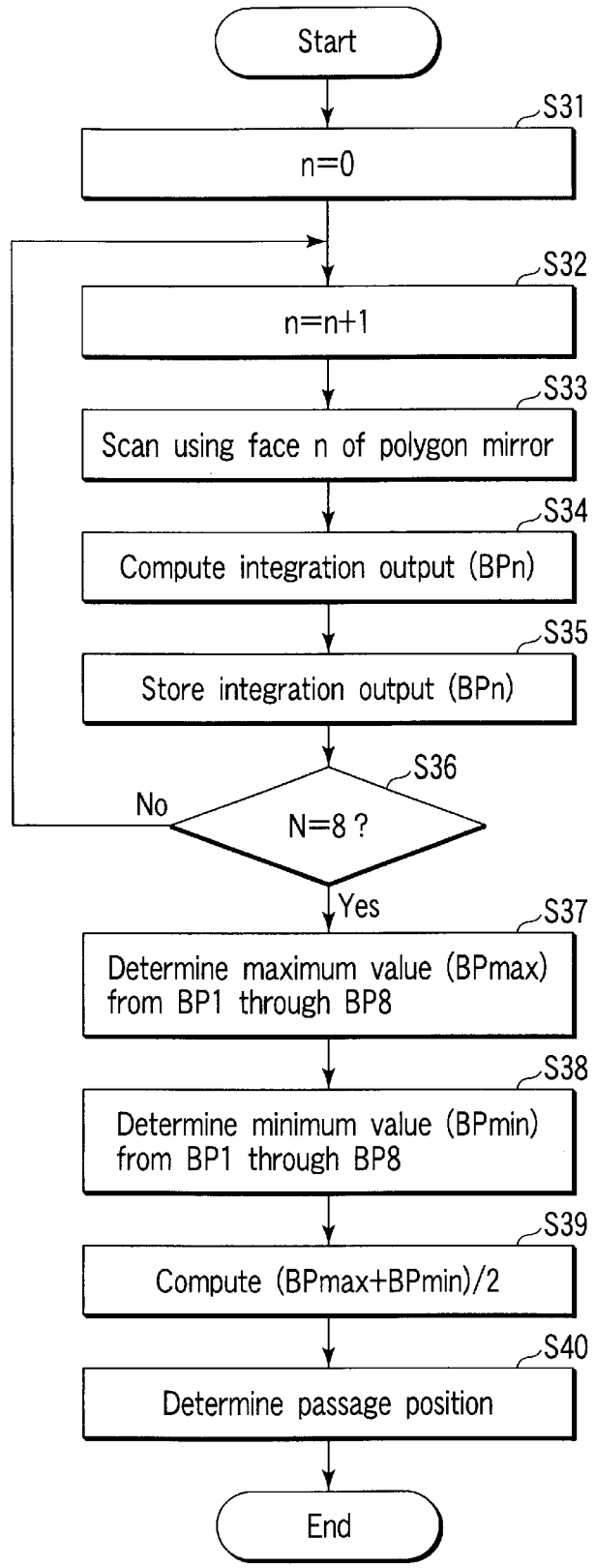
FIG. 21 is a flowchart for explaining a process to determine a light beam passage position according to a plurality of integration outputs.

FIG. 21 is a flowchart explaining a process of determining the light beam passage position according to a plurality of integration outputs.

First, the main control section 51 initializes data by setting n=0. When the data is initialized, the value n is incremented by 1 to compute a value of BPn corresponding to each surface (n) of the polygon mirror. Namely, the main control section 51 computes n=n+1 (step S32) and scans the light beam on the nth surface of the polygon mirror. When the light beam is scanned on the nth surface, the output processing circuit 40 computes a value of the integration output BPn (step S34) and supplies the value to the main control section 51. The main control section 51 stores the integration output BPn supplied from the output processing circuit in the memory 52 (step S35). When the value of the integration output BPn is stored in the memory 52, the main control section 51 checks for n=8 (step S36). If n is not 8, the main control section 51 repeats the process at steps S32 through S36 until the condition n=8 is satisfied.

When the condition n=8 is satisfied at step S36, the main control section 51 determines the maximum value (Bpmax) from the values for BP1 through BP8 stored in the memory 52 (step S37). Further, the main control section 51 determines the minimum value (Bpmin) from the values for BP1 through BP8 stored in the memory 52.

When determining the maximum and minimum values for BP1 through BP8 according to these operations, the main control section 51 computes a value for (Bpmax+BPmin)/2 (step S39). Based on the computed value for (BPmax+BPmin)/2, the main control section 51 determines the light beam passage position (step S40).

As mentioned above, the fourth embodiment computes the center value of integration outputs for the fluctuation (vibration) and assumes the computed center value for the integration outputs to be an integration output indicating the light beam passage position. It is possible to detect the most likely light beam passage position even if the light beam passage position fluctuates (vibrates) due to the polygon mirror misalignment or a vibration from the image formation apparatus.

The light beam passage position can be aligned to an intended position in a short time without diffusing the light beam control even if the light beam passage position fluctuates due to the polygon mirror misalignment or a vibration from the image formation apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light beam scanning apparatus to control a light beam comprising:
    a light source to generate the light beam;
    a scanning section to scan the light beam generated from said light source;
    a pair of sensors comprising a plurality of photoelectric conversion elements, wherein output from one sensor increases and output from the other sensor decreases according to a change of the light beam scan position in the vertical scan direction; and
    a control section which controls the light beam scan position in the vertical scan direction so that a difference between outputs from said pair of sensors becomes a target value, wherein the light beam volume output from said light source is set to a first light volume and the light beam volume output from said light source is set to a second light volume larger than said first light volume.

2. The light beam scanning apparatus according to claim 1, wherein
    said target value is set so as to correspond to a first control target for a scan position in the vertical scan direction of the light beam specified for the first light volume and to a second control target for a scan position in the vertical scan direction of the light beam specified for the second light volume.

3. The light beam scanning apparatus according to claim 1, further comprising:
    a light volume detection sensor to detect a light volume of the light beam scanned by said scanning section, wherein
        said control section controls the light beam scan position in the vertical scan direction by determining the light beam scan position in the vertical scan direction based on a difference between the light beam volume detected by said light volume detection sensor and an output from said pair of sensors.

4. The light beam scanning apparatus according to claim 1, further comprising:
    an integrator to integrate a difference between outputs from said pair of sensors; and
    a comparator to compare an integration output from this integrator with lower and upper bounds as said target value for the integration output, wherein
        said control section controls the light beam scan position in the vertical scan direction based on a comparison result from said comparator so that the integration output from said integrator falls between said lower bound and said upper bound.

5. A light beam scanning apparatus to control a light beam comprising:
    a light source to generate the light beam;
    a scanning section to scan the light beam generated from said light source;
    a sensor which comprises a plurality of photoelectric conversion elements and outputs a signal corresponding to the light beam scan position in the vertical scan direction;
    a comparator which compares an output from said sensor with upper and lower bounds as a target value for that output;
    a control section which controls the light beam scan position in the vertical scan direction based on a comparison result from this comparator so that an output from said sensor falls between said lower bound and said upper bound; and
    a single setup section which supplies said comparator with said lower bound and said upper bound specified by said control section.

6. The light beam scanning apparatus according to claim 5, wherein
    said sensor forms a pair comprising a plurality of photoelectric conversion elements, wherein output from one sensor increases and output from the other sensor decreases according to a change of the light beam scan position in the vertical scan direction;
    said comparator compares an output difference between said pair of sensors with lower and upper bounds as a target value for the output difference; and
    said control section controls the light beam scan position in the vertical scan direction based on a comparison result from said comparator so that an output difference between said pair of sensors falls between said lower bound and said upper bound.

7. The light beam scanning apparatus according to claim 5, wherein
    said setup section is a single converter which converts a digital signal from said control section to an analog signal.

8. The light beam scanning apparatus according to claim 5, wherein
    said comparator comprises a first comparator to compare a difference between outputs from said pair of sensors with said upper bound and a second comparator to compare a difference between outputs from said pair of sensors with said lower bound; and
    said setup section comprises a single converter which converts a digital signal to an analog signal, converts a lower bound specified by said control section in a digital signal to an analog signal and supplies this analog signal to the first comparator, and converts at upper bound specified by said control section in a digital signal to an analog signal and supplies this analog signal to the second comparator.

9. A light beam scanning apparatus to control a light beam comprising:
    a light source which generates the light beam having a specified diameter;
    a scanning section to scan the light beam generated from said light source;
    a pair of sensors which comprise a plurality of photoelectric conversion elements and are arranged so that said sensors are symmetrical with reference to a control target for said light beam's scan position in the vertical scan direction and an entire width in the vertical scan direction becomes smaller than the light beam's specified diameter in the vertical scan direction; and
    a control section which controls a peak position of a light volume for the light beam scanned by said scanning section in the horizontal scan direction based on a difference between outputs from said pair of sensors so that said peak position is aligned to said control target position.

10. A light beam scanning apparatus to control a light beam comprising:

a light source to generate the light beam;

a scanning section to scan the light beam generated from said light source;

a sensor which comprises a plurality of photoelectric conversion elements and outputs a signal corresponding to the light beam scan position in the vertical scan direction;

memory which stores an output value from said sensor each time said scanning section scans the light beam in the horizontal scan direction; and a determination section which determines the light beam scan position based on a plurality of output values store in this memory.

11. The light beam scanning apparatus according to claim 10, wherein said sensor forms a pair comprising a plurality of photoelectric conversion elements, wherein output from one sensor increases and output from the other sensor decreases according to a change of the light beam scan position in the vertical scan direction;

said memory stores a difference between outputs from said pair of sensors each time said scanning section scans the light beam in the horizontal scan direction; and said determination section determines the light beam scan position based on a difference between a plurality of outputs stored in said memory.

12. The light beam scanning apparatus according to claim 10, wherein said determination section determines a light beam scan position in the vertical scan direction based on a center value between the maximum and minimum values for a plurality of output differences stored in said memory.

13. The light beam scanning apparatus according to claim 10, wherein said determination section determines the light beam scan position in the vertical scan direction based on an average of a plurality of output differences stored in said memory.

14. The light beam scanning apparatus according to claim 10, wherein said scanning section is a polygon mirror comprising a plurality of surfaces to scan the light beam from said light source on a scan surface and performs a single scan in the horizontal scan direction on each surface of said polygon mirror;

said memory stores a difference between outputs from said pair of sensors each time each surface of said scanning section scans the light beam in the horizontal scan direction; and said control section determines the light beam scan position in the vertical scan direction based on each output difference stored in said memory according to scanning of the light beam on each surface of said polygon mirror.

* * * * *